United States Patent
Tanimura et al.

(10) Patent No.: US 8,428,769 B2
(45) Date of Patent: Apr. 23, 2013

(54) METHOD FOR MAKING OPTICAL ELEMENT, AND IMAGE FORMING APPARATUS

(75) Inventors: Ken Tanimura, Osaka (JP); Takeyoshi Saiga, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 12/855,262

(22) Filed: Aug. 12, 2010

(65) Prior Publication Data

US 2011/0042839 A1 Feb. 24, 2011

(30) Foreign Application Priority Data

Aug. 24, 2009 (JP) .................................. 2009-193029

(51) Int. Cl.
*B29C 45/00* (2006.01)

(52) U.S. Cl.
USPC ........................................... 700/200; 700/97

(58) Field of Classification Search .............. 700/95–98, 700/197, 200, 202, 203, 205
See application file for complete search history.

(56) References Cited

U.S. PATENT DOCUMENTS 5,549,855 A    8/1996  Nakanishi et al.

FOREIGN PATENT DOCUMENTS

| JP | 07-60857 A | 3/1995 |
| JP | 2002-248666 A | 9/2002 |

*Primary Examiner* — Carlos Ortiz Rodriguez
(74) *Attorney, Agent, or Firm* — Canon U.S.A., Inc. IP Division

(57) ABSTRACT

A method for injection molding an imaging optical element to be used in an optical scanning apparatus for guiding a light ray in a main scanning direction and a sub-scanning direction. In the imaging optical element, the light ray passes through at least one optical functional surface and does not pass over the meridional line including the optical axis. The imaging optical element is injection-molded through an initial molding step and other various measurement and correction steps.

3 Claims, 18 Drawing Sheets

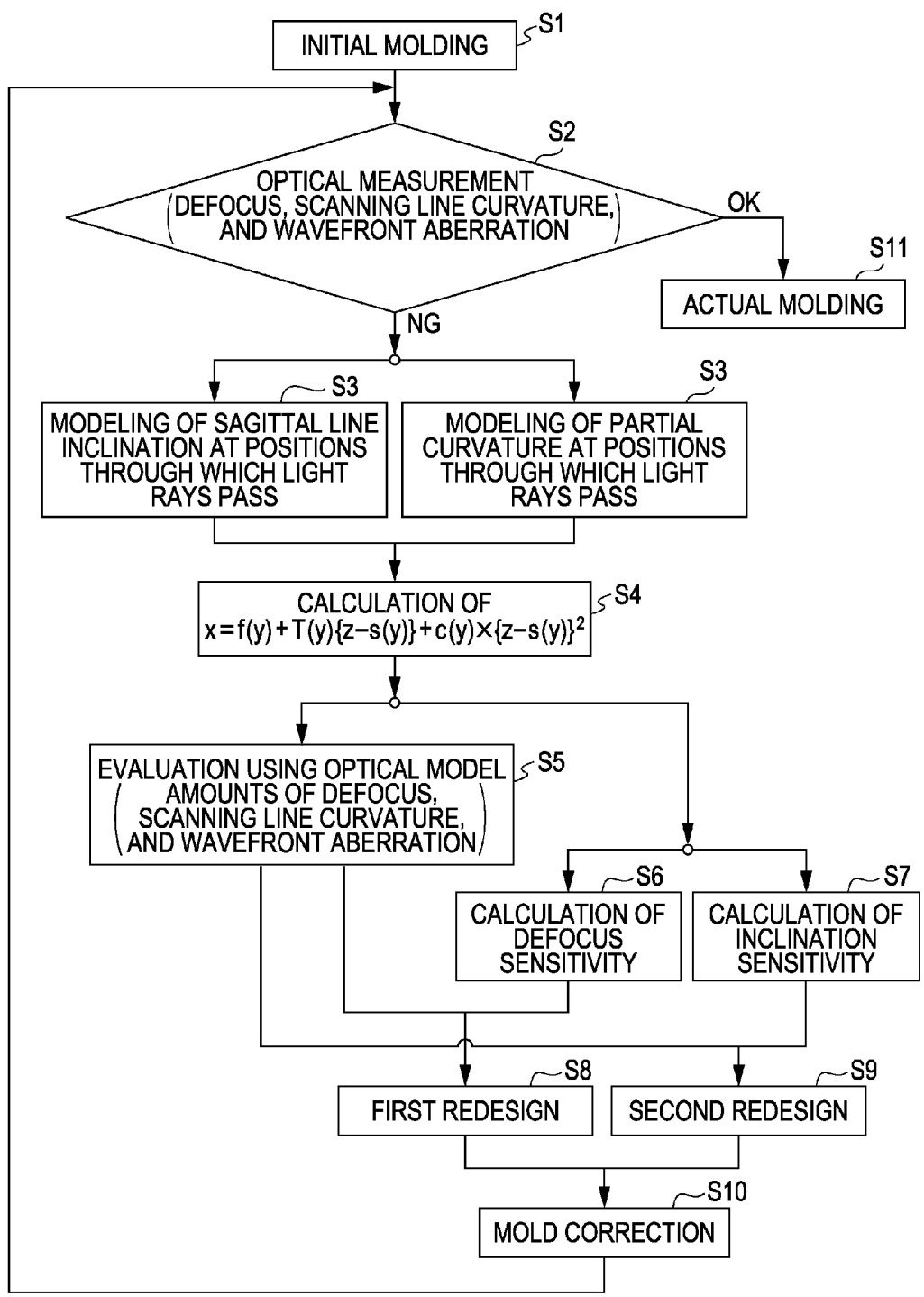

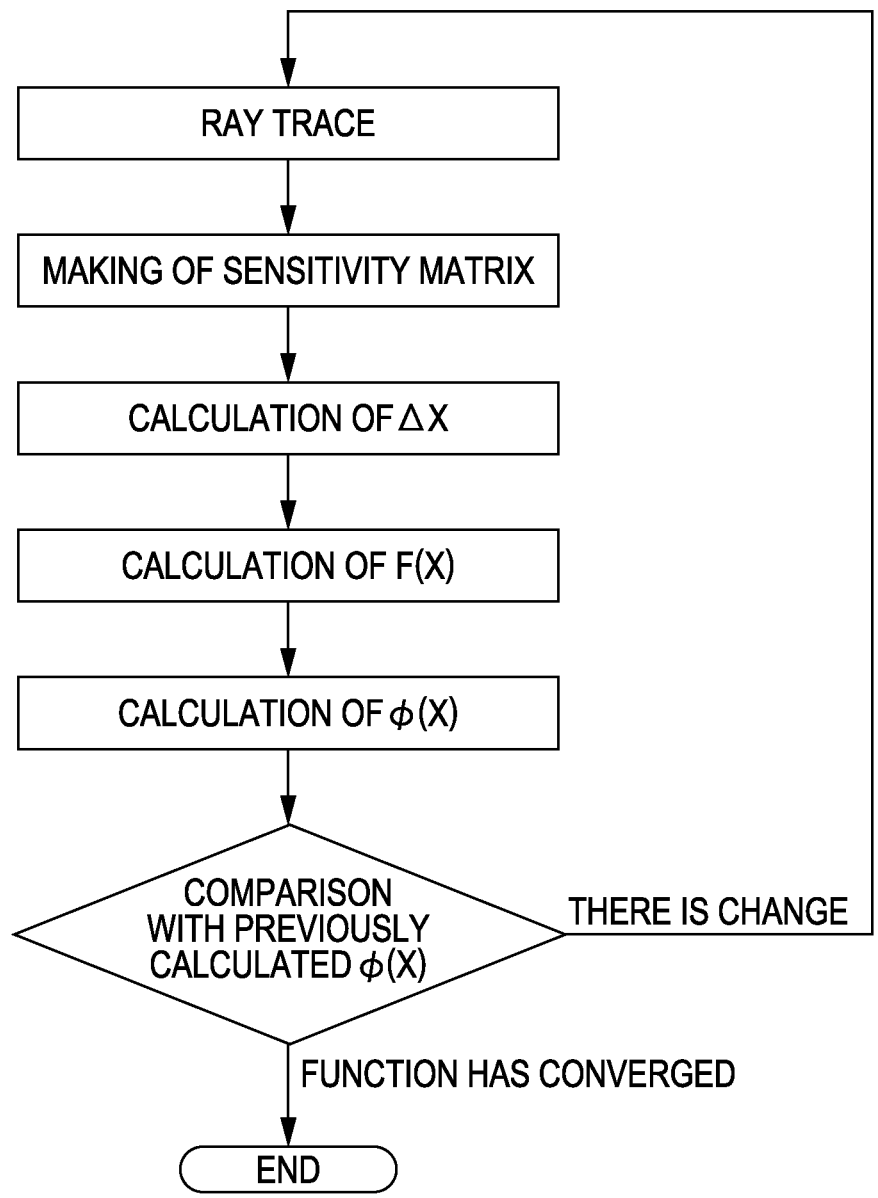

FIG. 8

| IMAGE HEIGHT | | $A_2$ | $A_4$ | $A_6$ | $A_8$ | $A_{10}$ |
|---|---|---|---|---|---|---|
| SENSITIVITY TO FOCUS CHANGE IN MAIN SCANNING DIRECTION | 150 mm | 0.08 | 0.79 | 0.14 | 0.16 | 0.16 |
| | 75 mm | 0.18 | 0.65 | 0.07 | 0.05 | 0.03 |
| | 0 mm | 0.59 | 0.00 | 0.00 | 0.00 | 0.00 |
| | −75 mm | 0.19 | 0.00 | 0.00 | 0.00 | 0.00 |
| | −150 mm | 0.09 | −0.01 | 0.00 | 0.00 | 0.00 |
| SENSITIVITY TO FOCUS CHANGE IN SUB-SCANNING DIRECTION | 150 mm | 0.00 | 0.00 | 0.00 | 0.00 | 0.00 |
| | 75 mm | 0.00 | 0.00 | 0.00 | 0.00 | 0.00 |
| | 0 mm | 0.00 | 0.00 | 0.00 | 0.00 | 0.00 |
| | −75 mm | 0.00 | 0.00 | 0.00 | 0.00 | 0.00 |
| | −150 mm | 0.00 | 0.00 | 0.00 | 0.00 | 0.00 |

| IMAGE HEIGHT | | $C_0$ | $B_2$ | $B_4$ | $B_6$ | $B_8$ | $B_{10}$ |
|---|---|---|---|---|---|---|---|
| SENSITIVITY TO FOCUS CHANGE IN MAIN SCANNING DIRECTION | 150 mm | 0.00 | 0.00 | 0.00 | 0.00 | 0.00 | 0.00 |
| | 75 mm | 0.00 | 0.00 | 0.00 | 0.00 | 0.00 | 0.00 |
| | 0 mm | 0.00 | 0.00 | 0.00 | 0.00 | 0.00 | 0.00 |
| | −75 mm | 0.00 | 0.00 | 0.00 | 0.00 | 0.00 | 0.00 |
| | −150 mm | 0.00 | 0.00 | 0.00 | 0.00 | 0.00 | 0.00 |
| SENSITIVITY TO FOCUS CHANGE IN SUB-SCANNING DIRECTION | 150 mm | 0.10 | 0.18 | 0.13 | 0.09 | 0.66 | 0.47 |
| | 75 mm | 0.09 | 0.10 | 0.04 | 0.02 | 0.06 | 0.03 |
| | 0 mm | 0.09 | 0.00 | 0.00 | 0.00 | 0.00 | 0.00 |
| | −75 mm | 0.09 | 0.00 | 0.00 | 0.00 | 0.00 | 0.00 |
| | −150 mm | 0.09 | 0.00 | 0.00 | 0.00 | 0.00 | 0.00 |

METHOD FOR MAKING OPTICAL ELEMENT, AND IMAGE FORMING APPARATUS

BACKGROUND OF THE INVENTION

1. Field of the Invention

The present invention relates to a method of making an optical element, and more specifically to an injection-molding method for making an optical element with advanced precision. The optical element so formed can be suitable for use in an image forming apparatus such as a laser beam printer, a digital copying machine, or a multifunction printer having an electrophotographic process.

2. Description of the Related Art

An optical scanning apparatus of a laser beam printer (LBP) or a digital copying machine typically includes an optical deflector (deflecting unit) in the form of a rotatable polygon mirror which periodically deflects a light beam that is optically modulated and emitted from a light source unit according to an image signal. The deflected light beam is converged to form a spot on the surface of a photosensitive recording medium (photosensitive drum) by an imaging optical system having an fθ characteristic. More specifically, the deflected light beam passes through the imaging optical system and is focused to form a spot-like image on a surface of a photosensitive recording medium. In order to maintain optimal imaging precision, the axis of the focused beam must be perpendicular to the surface of the photosensitive recording medium. In other words, the imaging optical system provides a flat image field at the surface of interest. By optically scanning the surface of the photosensitive recording medium, image recording is performed. However, since the surface of the photosensitive recording medium is the cylindrical surface of the photosensitive drum, it is difficult to maintain a flat image field at the surface of interest.

In this type of optical scanning apparatus, a plastic lens, which is easy to make and lightweight, is often used in an imaging optical system. A plastic lens is characterized by being suitable for mass production by injection molding.

In order to improve precision on the curvature of field on the surface of a photosensitive drum, to reduce the scanning line curvature on the surface of a photosensitive drum, and to improve the fθ characteristic, the optical functional surface of a plastic lens is often designed to have an aspherical shape. For this reason, the optical functional surface of a plastic lens needs to be formed by injection molding in a desired aspherical shape that can meet the highest desired precision.

However, it is known that when a plastic lens is formed by injection molding, precision on the surface shape of the completed lens is deteriorated by shrinkage. For example, when a lens is formed of plastic, the completed lens is smaller than the size of a cavity formed by an optical insert. The shape of the optical functional surface is also deformed by molding shrinkage, relative to the surface shape of the optical insert. If such an error is not within a design allowable range, the molded element cannot be used as a product.

On the other hand, if the displacement from a mold occurring at the time of molding is stable and does not vary greatly depending on the molding date and time and environment, and if the error is preliminarily corrected by the mold shape, the shape of a molding can be kept within the design allowable range and the molding can be used as a product.

Various methods for making an optical insert that take into account shrinkage and deformation at the time of molding have been proposed.

Japanese Patent Laid-Open No. 7-60857 discloses a method including forming a lens, measuring the shape error of the optical functional surface of the lens, and modifying an optical insert of a mold so as to compensate for the shape error due to the influence of nonuniform shrinkage of resin. Japanese Patent Laid-Open No. 2002-248666 discloses a method including correcting the shapes of some of optical functional surfaces so as to compensate for the curvature of field on the basis of the measurement result of optical characteristics.

In recent years, an optical system (for example, an oblique incidence optical system) in which a light beam (light ray) does not pass through a meridional line including a lens optical axis in an imaging optical system has been widely used for the purpose of making the whole apparatus compact. It is known that in such an optical system, the wavefront aberration in the direction of 45 degrees (hereinafter referred to as 45-degree astigmatism) varies depending on the shape of the sub-scanning cross section (the normal angle in the sub-scanning direction at a position where a light ray passes through the optical functional surface of a lens).

Japanese Patent Laid-Open No. 2002-248666 discloses redesigning the partial curvature in a particular optical functional surface so as to correct the curvature of field obtained in the optical focus measurement. However, it does not disclose the inclination at the position through which a light ray passes. For this reason, in the method disclosed in Japanese Patent Laid-Open No. 2002-248666, the 45-degree astigmatism may deteriorate, and the spot on the surface of the photosensitive drum may enlarge.

In addition, the height reached by a light ray on the surface of the photosensitive drum varies depending on the shape of the sub-scanning cross section (the normal angle in the sub-scanning direction at a position where a light ray passes through the optical functional surface of a lens). For this reason, in the method disclosed in Japanese Patent Laid-Open No. 2002-248666, the scanning line curvature may be deteriorated by change of the height reached by a light ray on the surface of the photosensitive drum.

SUMMARY OF THE INVENTION

One aspect of the present invention includes an injection molding method for making an imaging optical element. The imaging optical element so formed can be used in an optical scanning, in which the light ray does not pass over a meridional line including an optical axis of the imaging optical element. The injection molding method comprises: an initial molding step in which when the imaging optical element is injection-molded, molding conditions are set such that a constant shape error is stably formed on the optical functional surface of the imaging optical element; an optical measurement step in which the imaging optical element formed by the initial molding step is placed in an evaluation apparatus in which testing components of the evaluation apparatus are arranged in the same manner as components of the optical scanning apparatus during use, and an amount of defocus in an optical axis direction, an amount of wavefront aberration, and an amount of scanning line curvature at a plurality of image heights are measured on an image plane; a shape approximation step in which the shapes of all of the optical functional surfaces of the imaging optical element are measured, and a curved surface model is determined such that the sagittal line curvature and the sagittal line inclination of the imaging optical element are closest to the measurement result, at positions where light rays heading for a plurality of image heights pass through the optical functional surfaces; an evaluation step in which the amount of defocus in the optical axis direction, the amount of scanning line curvature, and the amount of wavefront aberration are evaluated in an optical simulation using the curved surface model based on aspherical coefficients obtained in the shape approximation step; a defocus sensitivity calculating step in which ray trace is performed using an optical model with the aspherical coefficients of the optical functional surfaces changed, the amount of change in the amount of defocus in the optical axis direction at the plurality of image heights are obtained, and the sensitivity of the amount of defocus to the change of each aspherical coefficient is calculated; an inclination sensitivity calculating step in which ray trace is performed using an optical model with the aspherical coefficients of the optical functional surfaces changed, the amount of scanning line curvature and the amount of wavefront aberration at the plurality of image heights are obtained, and sensitivities of the amount of scanning line curvature and the amount of wavefront aberration to the change of each aspherical coefficient are calculated; a first redesign step in which the shapes of one or more optical functional surfaces are newly redesigned on the basis of the sensitivity of the amount of defocus so that they agree with the difference between the amount of defocus obtained in the evaluation step and the result of calculation of the amount of defocus obtained in the defocus sensitivity calculating step; a second redesign step in which the shapes of one or more optical functional surfaces are newly redesigned on the basis of the sensitivity of the amount of scanning line curvature so that they agree with the difference between the amount of scanning line curvature obtained in the evaluation step and the result of calculation of the amount of scanning line curvature obtained in the inclination sensitivity calculating step and so as not to deteriorate the amount of wavefront aberration; a correction step in which, in the optical functional surfaces obtained in the first and second redesign steps, reflecting the difference between the shape obtained in the shape approximation step and the first and second redesign steps and the shape of the designed value, the shape of a cavity surface of a molding member is corrected and processed; and an actual molding step in which molding is performed using the molding member obtained in the correction step.

If the result of evaluation of an imaging optical element injection-molded using the molding member obtained in the correction step, in the defocus sensitivity calculating step is below standard, the defocus sensitivity calculating step, the inclination sensitivity calculating step, the first redesign step, the second redesign step, the correction step, and the actual molding step may be repeated.

In the shape approximation step, the following aspherical equation Δx may be used:

$$\Delta x = T(y) \times \{z - s(y)\} + c(y) \times \{z - s(y)\}^2$$

where y is the position in the main scanning direction on the optical functional surface, z is the position in the sub-scanning direction on the optical functional surface, T(y) is the inclination in the sub-scanning direction at the position y of the optical functional surface, c(y) is the curvature in the sub-scanning direction at the position y of the optical functional surface, and s(y) is the passing height of a light ray at the position y of the optical functional surface.

The present invention can achieve: a method for making an optical element in which when an optical element used in an optical scanning apparatus is made by injection molding, the curvature of field, the wavefront aberration, the scanning line curvature, and the like can be reduced; and an image forming apparatus.

Further features of the present invention will become apparent to a person having ordinary skill in the art from the following description of exemplary embodiments with reference to the attached drawings.

BRIEF DESCRIPTION OF THE DRAWINGS

FIG. 1 is a flowchart showing a method for making an optical element according to a first embodiment of the present invention.

FIG. 7 is a flowchart showing the redesign.

FIG. 8 illustrates sensitivity tables in the redesign.

DESCRIPTION OF THE EMBODIMENTS

The embodiments of the present invention will now be described with reference to the drawings.

First Embodiment

Figure 2A:
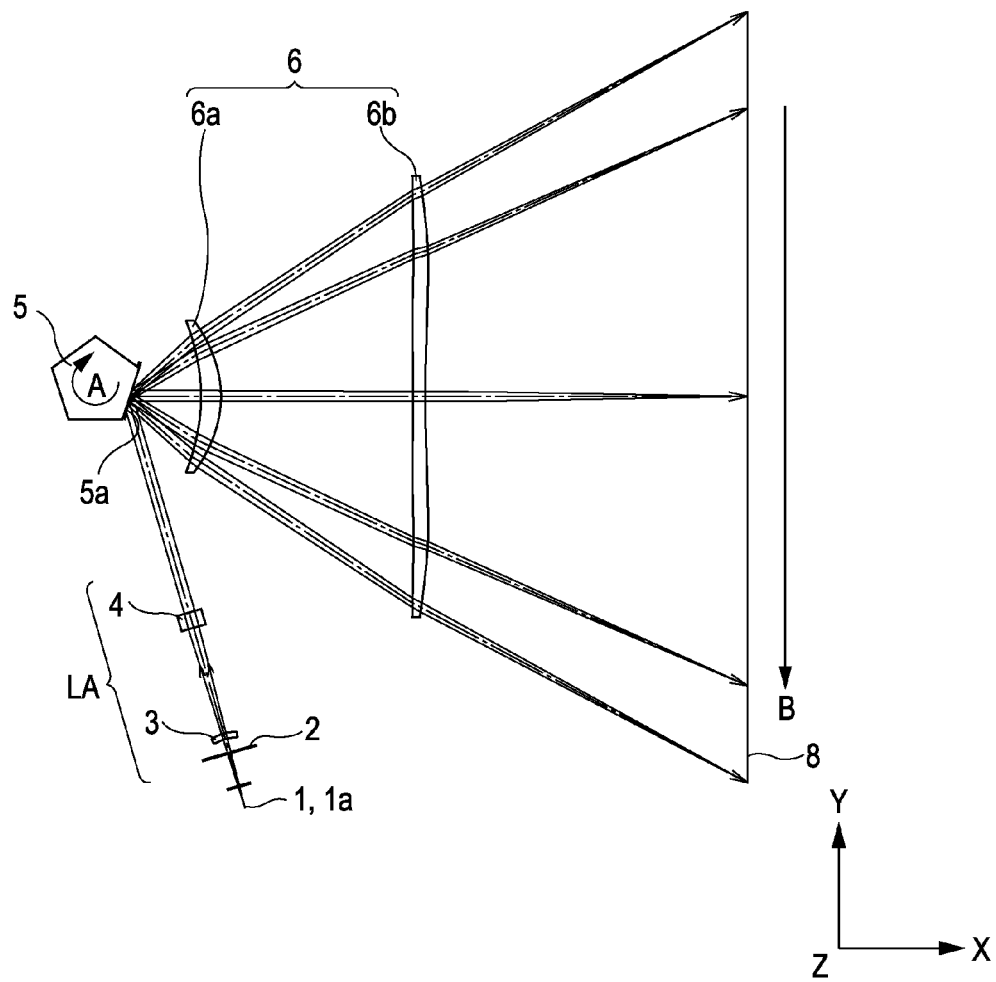
FIGS. 2A and 2B are respectively a main scanning sectional view and a sub-scanning sectional view in the first embodiment of the present invention.
Figure 2B:
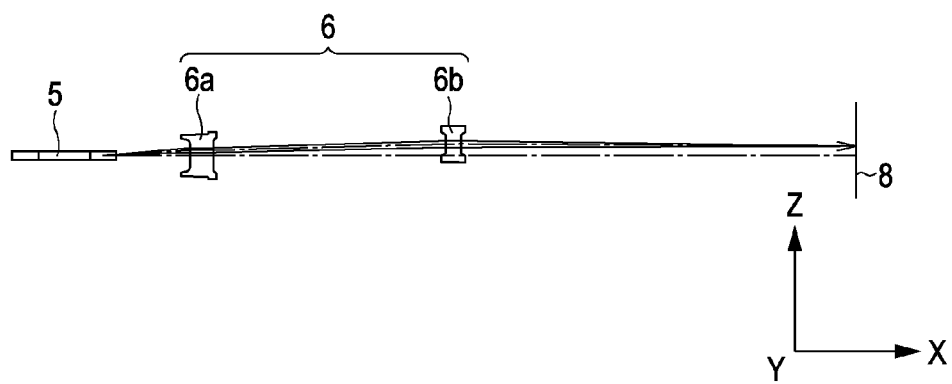

FIG. 1 is a flowchart showing a method for making an optical element according to a first embodiment of the present invention. FIG. 2A is a sectional view in the main scanning direction (main scanning sectional view) of parts of an optical scanning apparatus including an optical element made by the method of the present invention. FIG. 2B is a sectional view in the sub-scanning direction (sub-scanning sectional view) of the parts of FIG. 2A.

In the following description, the term "sub-scanning direction (Z direction)" means a direction parallel to the axis of rotation of the deflecting unit. The term "main scanning cross section" means a cross section having a normal in the sub-scanning direction (the direction parallel to the axis of rotation of the deflecting unit). The term "main scanning direction (Y direction)" means a direction in which a light beam deflected and scanned by the deflecting unit is projected onto the main scanning cross section. The term "sub-scanning cross section" means a cross section having a normal in the main scanning direction. Alternatively, when only the lens element is considered, a "main scanning direction" is a direction along the physical length of the optical functional surface of the lens; and a "sub-scanning direction" is a direction along the width of the optical functional surface of the lens. In FIGS. 2A and 2B, the main scanning direction is the Y direction, and the sub-scanning direction is the Z direction.

In FIGS. 2A and 2B, reference numeral 1 denotes a light source unit, such as a semiconductor laser. In this embodiment, the light source unit 1 has a single light emitting portion (light emitting point) 1a. However, the light source unit 1 may have two or more light emitting portions. Alternatively, a plurality of light sources each having a single light emitting portion may be used. Having a plurality of light emitting portions can speed up optical scanning without increasing the rotation speed of the optical deflector.

Reference numeral 2 denotes an aperture stop, which limits and shapes a light beam passing through it. Reference numeral 3 denotes a collimator lens (condenser lens), which converts a diverging light beam emitted from the light source unit 1 into a substantially parallel (collimated) light beam. Reference numeral 4 denotes a cylindrical lens, which has a predetermined power only in the sub-scanning cross section (sub-scanning direction) and causes the light beam passing through the collimator lens 3 to form a substantially linear image on a deflecting surface (reflecting surface) 5a of an optical deflector 5 to be described below or the vicinity thereof in the sub-scanning cross section. The collimator lens 3 and the cylindrical lens 4 may be replaced by a single optical element that can perform the optical functions of both at the same time. The aperture stop 2, the condenser lens 3, and the cylindrical lens 4 are components of an incidence optical system LA.

In this embodiment, in the sub-scanning cross section, the optical axis of the collimator lens 3 and the optical axis of the cylindrical lens 4 are inclined to the deflecting surface 5a of an optical deflector 5. In other words, a light beam emitted from the light source unit 1 is incident on the deflecting surface 5a of an optical deflector 5 obliquely in the sub-scanning direction. Accordingly, the incidence optical system LA may also be referred to as an oblique incidence optical system.

Reference numeral 5 denotes an optical deflector 5 serving as an deflecting unit. The optical deflector 5 is a rotatable polygon mirror having, for example, five facets, and is rotated by a driving unit (not shown), such as a motor, in a circular direction (e.g., arrow A in the figure) at a predetermined speed. Reference numeral 6 denotes an imaging optical system a having a condensing function and an fθ characteristic. The imaging optical system 6 includes first and second imaging lenses (fθ lenses) 6a and 6b that are optical elements made by the injection molding method of the present invention to be described below. The first and second imaging lenses 6a and 6b are optical elements in which a light beam passes through one or more optical functional surfaces, but it does not pass through the meridional line including the optical axis. In this embodiment, lenses 6a and 6b are preferably made of plastic, resin, a polymer compound, or other material suitable for injection molding. Lenses 6a and 6b are configured to cause the light beam deflected and scanned by the optical deflector 5 to form an image on a surface to be scanned. In addition, the first and second imaging lenses 6a and 6b provide a conjugate relationship between the deflecting surface 5a of the optical deflector 5 and the photosensitive drum surface 8 in the sub-scanning cross section, thereby performing surface tilt compensation of the deflecting surface.

In this embodiment, the diverging light beam emitted from the light source unit 1 passes through the aperture stop 2, by which the light beam (the amount of light) is limited. The light beam is then converted into a substantially parallel or collimated light beam by the collimator lens 3, and is made incident on the cylindrical lens 4. The parallel light beam incident on the cylindrical lens 4 exits without change in the main scanning cross section. In the sub-scanning cross section, the light beam converges and forms a substantially linear image (a linear image extending in the main scanning direction) on the deflecting surface 5a of the optical deflector 5. The light beam deflected and scanned by the deflecting surface 5a of the optical deflector 5 is passed through the imaging optical system 6 and caused to form a spot-like image on the photosensitive drum surface 8. By rotating the optical deflector 5 in the direction of arrow A, the photosensitive drum surface 8 is optically scanned in the direction of arrow B (main scanning direction) at a predetermined speed. In this manner, image recording is performed on the photosensitive drum surface 8 serving as a recording medium.

Method of Making Optical Element

The first and second imaging lenses 6a and 6b serving as imaging optical elements in this embodiment can be made through the exemplary flow process shown in FIG. 1.

Specifically, when an optical element is injection-molded, molding conditions are set such that a constant shape error is stably formed on the optical functional surface of the optical element (initial molding step) (S1). Next, the injection-molded optical element is placed in an evaluation apparatus in which components are arranged in the same manner as those in the optical scanning apparatus in use. In the evaluation apparatus, the amount of defocus in the optical axis direction, the amount of wavefront aberration, and the amount of scanning line curvature at a plurality of image heights are measured on the image plane (optical measurement step) (S2). In the optical measurement step, if the result of measurement is acceptable-OK (if the focus error between the measured value and the design value is within an allowable range), an optical insert is formed on the basis of the design value (actual forming step) (S11). However, if the result of measurement is not acceptable-NG, the shapes of all of the optical functional surfaces of the imaging optical element are measured, and a curved surface model is determined such that the curvature and inclination in the sub-scanning direction are closest to the measurement result, at positions where light rays heading for a plurality of image heights pass through the optical functional surface (shape approximation step) (S3).

In the shape approximation step, the following aspherical equation Δx is used (S4):

$$\Delta x = T(y) \times \{z - s(y)\} + c(y) \times \{z - s(y)\}^2$$

where y is the position in the main scanning direction on the optical functional surface, z is the position in the sub-scanning direction on the optical functional surface, $T(y)$ is the inclination in the sub-scanning direction at the position y of the optical functional surface, $c(y)$ is the curvature in the sub-scanning direction at the position y of the optical functional surface, and $s(y)$ is the passing height of a light ray at the position y of the optical functional surface.

Next, the amount of defocus of the optical system, the amount of scanning line curvature, and the amount of wavefront aberration are evaluated in an optical simulation using the curved surface model based on aspherical coefficients obtained in the shape approximation step (evaluation step) (S5). Ray trace is performed using the optical model with the aspherical coefficients of the optical functional surface minutely changed, the amounts of change in the amount of defocus in the optical axis direction at a plurality of image heights are obtained, and the sensitivity of the amount of defocus to the change of each aspherical coefficient is calculated (defocus sensitivity calculating step) (S6). In addition, ray trace is performed using the optical model with the aspherical coefficients of the optical functional surface minutely changed, the amount of scanning line curvature and the amount of wavefront aberration at a plurality of image heights are obtained, and the sensitivities of the amount of scanning line curvature and the amount of wavefront aberration to the change of each aspherical coefficient are calculated (inclination sensitivity calculating step) (S7).

Next, the shapes of one or more optical functional surfaces are newly redesigned on the basis of the sensitivity of the amount of defocus so that they agree with the difference between the amount of defocus obtained in the evaluation step and the result of calculation of the amount of defocus obtained in the defocus sensitivity calculating step (first redesign step) (S8). The shapes of one or more optical functional surfaces are newly redesigned on the basis of the sensitivity of the amount of scanning line curvature so that they agree with the difference between the amount of scanning line curvature obtained in the evaluation step and the result of calculation of the amount of scanning line curvature obtained in the inclination sensitivity calculating step and so as not to deteriorate the amount of wavefront aberration (second redesign step) (S9). Next, in the surfaces obtained in the first and second redesign steps, reflecting the difference between the shape obtained in the shape approximation step and the first and second redesign steps and the shape of the design value, the shape of the cavity surface of the molding member is corrected and processed (correction step) (S10).

Next, the optical measurement step is returned to and measurement is performed again. If the result of the measurement is OK, molding is performed using the optical insert obtained in the correction step (actual molding step) (S11).

In this embodiment, if the result of evaluation of an imaging optical element injection-molded using the optical insert obtained in the correction step, in the defocus sensitivity calculating step is below standard, the subsequent steps are repeated. That is to say, if the result of evaluation performed as shown in FIG. 1 is below standard, the defocus sensitivity calculating step, the inclination sensitivity calculating step, the first redesign step, the second redesign step, and the actual molding step are repeated.

Each step will be described. On the basis of design values made using optical design software or the like, the shape of an optical insert of a mold for making the shape of the optical functional surface of an imaging lens is first determined. The optical insert is then formed of a high temperature rated material, such as stainless steel. Its optical functional surface is plated with a metal having good cutting-workability, such as nickel, so as to facilitate correction work to be described below.

By cutting the plated portion into a given shape, an optical insert for initial molding is completed. For the given shape, if the design value shape, or the shrinkage rate of the material used is known, the error from the design value due to molding shrinkage is reduced by multiplying the design value by the shrinkage rate. As a result, the amount of plating to be cut to correct the optical insert is reduced.

Next, molding is performed using the optical insert made (initial molding step). The structures of molds vary depending on the pressurizing capacity of the molding machine, the size of the lens, the number of lenses obtained in a single molding cycle (the number of cavities), and the like. Therefore, not all lenses can obtain "stable molding" under the same molding conditions. The term "stable molding" used herein means:

(1-1) local deformation (sink mark) does not occur in the optical functional surface;
(1-2) spot enlargement due to birefringence does not occur;
(1-3) the optical functional surfaces of all of the cavities have substantially the same shape; and
(1-4) the shape of optical functional surface is substantially constant regardless of date and time of molding.

In order to obtain the "stable molding," molding conditions, such as the pressure applied to lenses at the time of molding (holding pressure), the time of one cycle of molding (molding takt time), and the internal temperature of the mold (mold temperature), are adjusted for each lens. By adjusting the above-described molding conditions, the first molding (initial molding) is obtained. On this initial molding, the thickness of the central part, the distance from the reference plane to the surface vertex of the optical functional surface, and the shape of the optical functional surface are measured, and the initial performance is thereby evaluated (shape approximation step).

Figure 3:
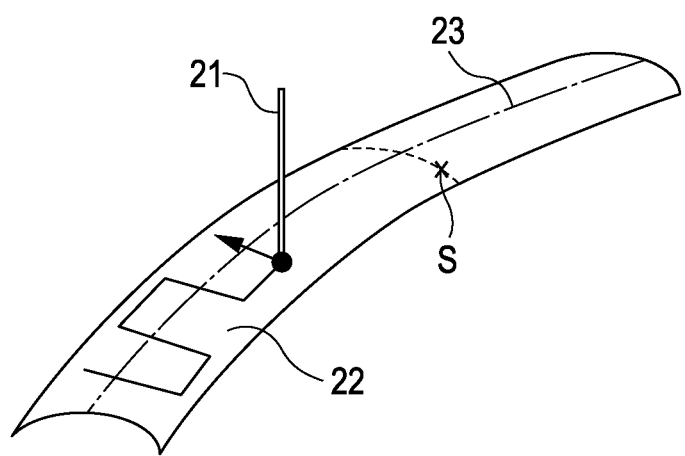
FIG. 3 shows a method for measuring the surface shape of the optical functional surface.

In the measurement of the optical functional surface, as shown in FIG. 3, a measurement probe 21 is moved relative to the optical functional surface 22 so as to describe a path shown in the figure, and three-dimensional evaluation is thereby performed at a small pitch. Examples of evaluation result are shown in FIGS. 4A, 4B, 4C, and 4D.

Figure 4A:
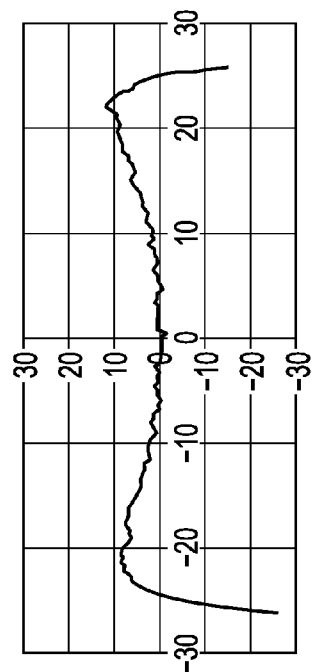
FIGS. 4A, 4B, 4C, and 4D show the shape error in the main scanning direction and the sub-scanning direction of the optical functional surface, and the inclination error in the sub-scanning direction of the optical functional surface.
Figure 4B:
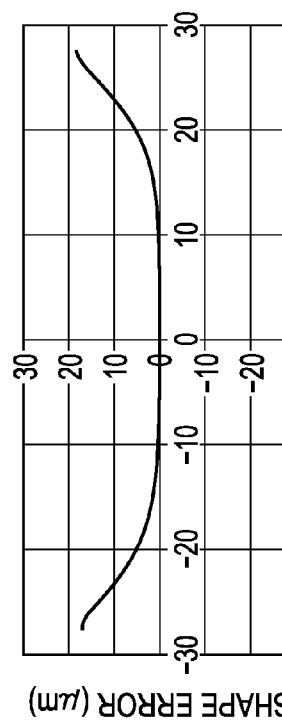
Figure 4C:
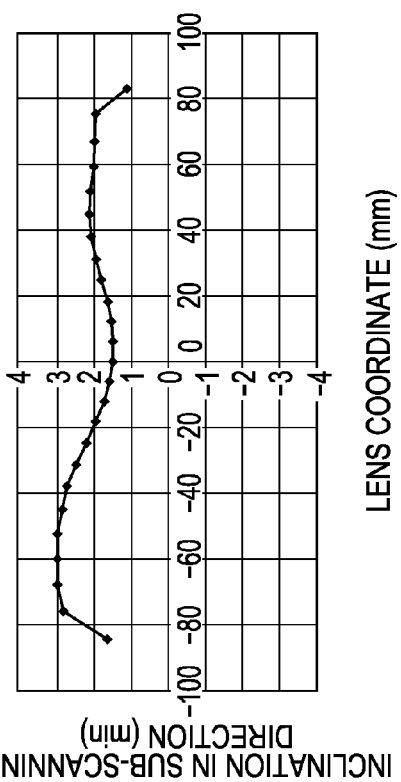
Figure 4D:
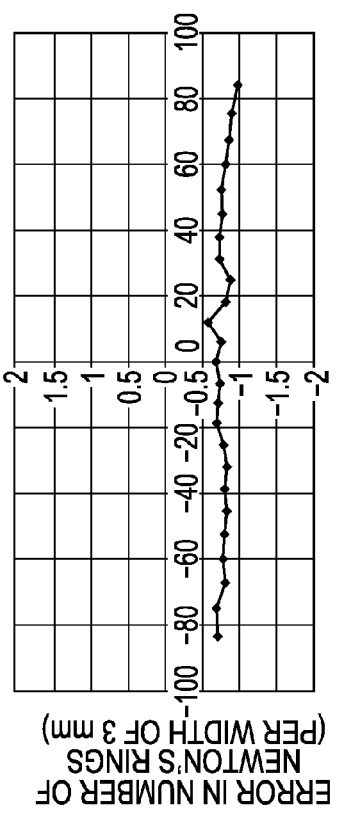

FIG. 4A shows the error in the shape of the optical functional surface relative to the design shape in the main scanning direction, and shows that the shape error increases with increasing distance from the lens coordinate 0 (main scanning shape error). FIG. 4B shows the error in the number of Newton's rings in the main scanning direction (main scanning Newton error). The error was calculated as follows: on the measured shape of the optical functional surface in the main scanning direction, quadratic function fitting was performed in a particular range (for example, a width of 10 mm); the partial curvature was obtained from the second-order and first-order derivative values of the function obtained; and the error in the number of Newton's rings relative to the partial curvature of the design value was calculated. FIG. 4C shows the error in the number of Newton's rings in the sub-scanning direction (sub-scanning Newton error). The error was calculated as follows: the optical functional surface was divided into a predetermined number of sections relative to the main scanning direction as shown in FIG. 3; in each section, the cross-sectional shape in the direction normal to the meridional line of the optical functional surface was measured; and the error in the number of Newton's rings from the design value at positions through which light rays actually pass was calculated. FIG. 4D shows the inclination θ of the cross-sectional shape to the direction normal to the meridional line at positions where light rays pass through the optical functional surface, from the cross-sectional shape in the direction normal to the meridional line of the optical functional surface (sub-scanning inclination). The meridional line of the optical functional surface means a line passing through the vertex of the optical functional surface. The cross-sectional shape in the direction normal to the meridional line is shown by a dash-dotted line 23 in FIG. 3. The position through which a light ray actually passes is the point S in FIG. 3.

In order to calculate the shape of an optical insert that corrects the main scanning shape error, the main scanning Newton error, the sub-scanning Newton error, and the sub-scanning inclination obtained as above, the amount of error needs to be fitted with a function.

The shape of an optical functional surface of a lens in this embodiment is expressed by the following expression formula. When the point of intersection of each lens surface with the optical axis is the origin, the optical axis direction is the x-axis, the axis perpendicular to the optical axis in the main scanning cross section is the y-axis, and the axis perpendicular to the optical axis in the sub-scanning cross section is the z-axis, the shape in the meridional line direction corresponding to the main scanning direction is:

$$x = \frac{y^2/R}{1 + \sqrt{1-(1+k)y^2/R^2}} + A_2 y^2 + A_4 y^4 + A_6 y^6 + A_8 y^8 + A_{10} y^{10}$$ (Equation 1)

(where R is the curvature radius, and k, $A_2$, $A_4$, $A_6$, $A_8$, and $A_{10}$ are aspherical coefficients). The shape in the sagittal line direction corresponding to the sub-scanning direction (the direction including the optical axis and perpendicular to the main scanning direction) is:

$$x = \frac{cz^2}{1 + \sqrt{1-c^2 z^2}}$$ (Equation 2)

Herein, $c = c_0 + B_2 Y^2 + B_4 Y^4 + B_6 Y^6 + B_8 Y^8 + B_{10} Y^{10}$ (where $c_0$ is the sagittal line curvature on the optical axis, and $B_2$, $B_4$, $B_6$, $B_8$, and $B_{10}$ are coefficients). The sagittal line curvature c is defined in a plane that includes a normal to the meridional line at each position and that is perpendicular to the main scanning plane. In order to fit the shape error in the main scanning, with respect to such design values, the following function is used:

$$\Delta x = E_2 Y^2 + E_4 Y^4 + E_6 Y^6 + E_8 Y^8 + E_{10} Y^{10} + E_{12} Y^{12} + E_{14} Y^{14} + E_{16} Y^{16}$$ (Equation 3)

where $E_2$, $E_4$, $E_6$, $E_8$, $E_{10}$, $E_{12}$, $E_{14}$, and $E_{16}$ are aspherical coefficients.

Figure 5A:
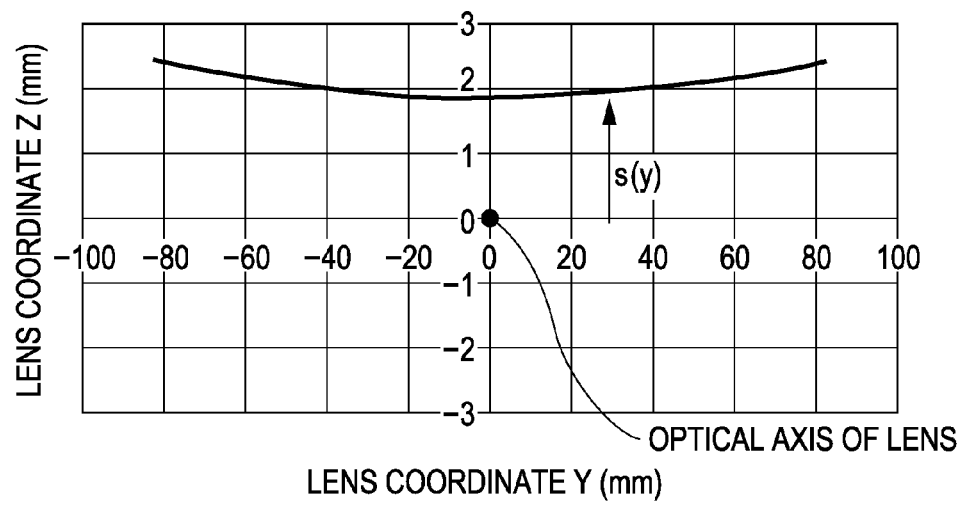
FIGS. 5A and 5B show the locus of the light ray passing through the optical functional surface, and the outline of a defocus measurement tool for evaluating optical elements.

Next, when the locus of the light ray passing through the optical functional surface is as shown in FIG. 5A, and when the passing height of the light ray relative to the meridional line of the optical functional surface is s(y), the following function (aspherical equation Δx) is used to fit the error in the number of Newton's rings in the sub-scanning cross section; and $c_A$ and $T_A$ are the sagittal line curvature error and the sagittal line inclination error, respectively, at a position through which a light ray passes, in the sub-scanning cross section passing through the optical axis.

$$\Delta x = T(y) \times \{z - s(y)\} + c(y) \times \{z - s(y)\}^2$$ (Equation 4)

Herein, $T(y) = T_0 + M_2 Y^2 + M_4 Y^4 + M_6 Y^6 + M_8 Y^8 + M_{10} Y^{10} + M_{12} Y^{12}$ ($T_0$ is the sagittal line inclination on the optical axis, and $M_2$, $M_4$, $M_6$, $M_8$, $M_{10}$, and $M_{12}$ are coefficients), $c(y) = (c_0 + F_2 Y^2 + F_4 Y^4 + F_6 Y^6 + F_8 Y^8 + F_{10} Y^{10} + F_{12} Y^{12})/2$ ($c_0$ is the sagittal line curvature on the optical axis, and $F_2$, $F_4$, $F_6$, $F_8$, $F_{10}$, and $F_{12}$ are coefficients). As described above, by least-squares approximating the shape error data of the optical functional surface of the initial molding using Equations 3 and 4, functional approximation can be performed with respect to all of the optical functional surfaces. Therefore, by adding this function to the shape function of the original optical insert, the shapes of all of the optical functional surfaces of a lens to be formed next are brought closer to the design value shapes. In parallel with the shape measurement, the optical performance is evaluated using this lens (optical measurement step).

Figure 5B:
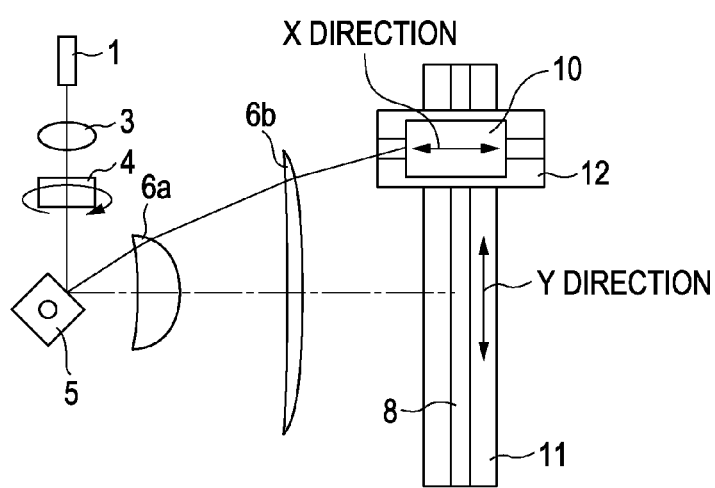

For evaluation of the optical performance, an evaluation tool (evaluation device) shown in FIG. 5B is made. This evaluation tool includes a semiconductor laser 1, a collimator 3, a cylindrical lens 4, an optical deflector 5 (polygon mirror), and imaging lenses 6a and 6b located on a flat plate in the same optical arrangement as those of the optical scanning apparatus. By making the imaging lenses replaceable, the optical performance of all of the lenses can be evaluated. As an observation system, a CCD camera 10 is disposed at a position such that the distance from the emitting point of the semiconductor laser 1 to the position is the same as the distance from the emitting point of the semiconductor laser 1 to the photosensitive drum surface 8. The CCD camera 10 moves in the X direction shown in FIG. 5B (the direction of arrow of a first rail 12), the Y direction (the direction of arrow of a second rail 11), and the Z direction (not shown), and can measure the spot diameters in the main scanning direction and the sub-scanning direction (PSF and LSF) and the peak amount of light at each position.

Specifically, the CCD camera 10 is moved to an image height to be measured, then the optical deflector 5 (polygon mirror) is set at an angle calculated from the f0 coefficients of the imaging lenses 6a and 6b, and the semiconductor laser 1 is caused to emit light so that a spot enters the observation area of the CCD camera 10.

Figure 6A:
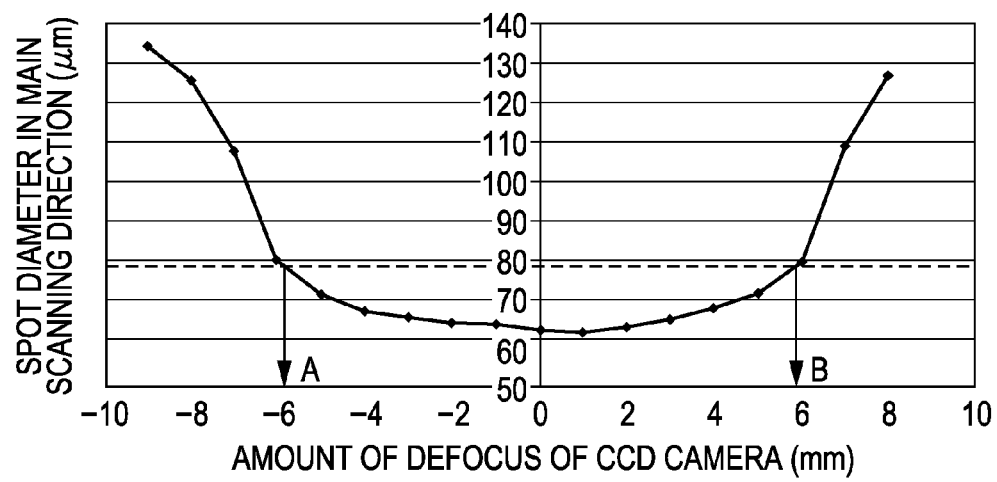
FIGS. 6A and 6B show the spot diameter in the case where a CCD camera is moved in the X direction, and the comparison between the depth center position of an imaging lens evaluated with the defocus measurement tool and the design value.

Next, while being moved in the X direction by a predetermined pitch at a time, the CCD camera 10 is moved in the Y direction and the Z direction so that the center of gravity of the spot is always located in the center of the CCD camera 10. By outputting the position of the CCD camera 10 and the spot diameters on a personal computer, the defocus characteristic of the spot diameter at a particular image height shown in FIG. 6A can be observed. From this defocus characteristic, X coordinate values A and B crossing the upper limit standard of the spot diameter in the main scanning direction (or the sub-scanning direction) are calculated. The average of the X coordinate values A and B gives the depth center (focus position). The focus positions at several evaluation image heights are obtained as shown in FIG. 5A.

Figure 6B:
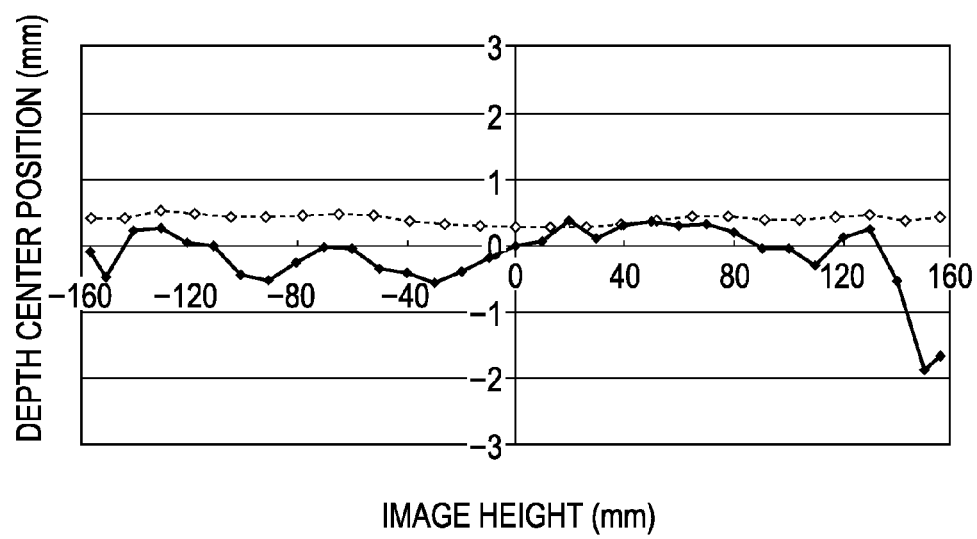

FIG. 6B shows comparison between the depth center position of an imaging lens evaluated with the evaluation tool (defocus measurement tool) and the design value. In FIG. 6B, the solid line shows the actually measured focus position of an imaging lens, and the dotted line shows the focus position according to the design value. The difference between the actual measured value and the design value is the amount predicted to originate in the imaging lens. By outputting the irradiation position in the main scanning direction and the sub-scanning direction at the designed image plane position from the positional information of the CCD camera 10, the fθ characteristic and the amount of scanning line curvature can be estimated.

The defocus from the design value in the main scanning direction and the sub-scanning direction obtained with the evaluation tool is attributed to the following two causes:
(2-1) influence of the deviation of the shape of the optical functional surface from the design value; and
(2-2) influence from the inside of the lens.

The above (2-2) can be eliminated by returning the shape of the optical functional surface to the design value. Therefore, a shape correction is performed so as to return the shape obtained in the shape approximation step to the design value. However, to calculate the influence of the above (2-2), the influence of the above (2-1) needs to be separated from the present defocus. The above (2-1) can be known by newly defining the shapes of all of the optical functional surfaces of the imaging lens on the basis of a function calculated in the shape approximation step, making an optical model on the basis of the shapes of the optical functional surfaces, and calculating the focus position by ray trace. The difference between the focus position obtained with the evaluation tool and the previously obtained (2-1) is the influence of the above (2).

If the amount of the above (2-2) is not more than an assumed standard (for example, ⅕ of the allowable depth width of the spot diameter in the design value), correction to restore the shape is performed without performing a redesign. If the amount of the above (2-2) is larger than the assumed standard, only a particular surface is newly redesigned and desired coefficients are found to estimate the amount of shape change corresponding to the above (2-2), using the previously made optical model.

After the coefficient value of the optical functional surface of the particular surface is found by redesign, the difference between the coefficient value of the redesigned surface and the design value is obtained, and the amount of correction is determined with the amount of anisotropic shrinkage taken into account. By adding the amount of correction to the coefficient value of the shape of the initial optical insert, the shape of the optical insert that takes into account the shape error and internal deviation is determined. As for the other unredesigned optical functional surfaces, the coefficient value of the function approximating the shape error that takes into account the amount of anisotropic shrinkage is added to the shape of the initial optical insert.

The redesign step will be described. The shape of the optical functional surface of the imaging lens that agrees with the result of focus measurement with the evaluation tool is predicted by redesigning. For the coefficients of the above-described Equation 1, the following X is defined as a variable vector. The focus in the main scanning direction at the measurement image height in X is denoted by $f_m(X)$. The focus in the main scanning direction obtained by actual measurement at the measurement image height is denoted by $f_{m,tar}(X)$. At that time, the following F(X) is defined as an evaluation function vector.

$$X = \begin{bmatrix} X_1 \\ X_2 \\ \vdots \\ X_5 \end{bmatrix} = \begin{bmatrix} A_2 \\ A_4 \\ \vdots \\ A_{10} \end{bmatrix}, \quad F(X) = \begin{bmatrix} F_1(X) \\ F_2(X) \\ \vdots \\ F_m(X) \end{bmatrix} \quad \text{(Equation 5)}$$

$$(F(X) = f_m(X) - f_{m,tar}(X))$$

In the automatic design of a lens, a DLS method (Damped Least Squares method) is known. By minimizing a merit function φ(X) defined by the following mathematical expression, the shape of the optical functional surface of a lens for obtaining desired performance is obtained. This damped least squares method is proposed by Wynne, et al.

$$\phi(X) = F^T(X)F(X) + \rho \Delta X^T \Delta X \quad \text{(Equation 6)}$$

In Equation 6, $F^T(X)$ is a transpose of F(X), and $\Delta X^T$ is a transpose of the variation ΔX of each variable, and ρ is a parameter controlling the amount of nonlinear correction and is called damping factor. The first-order Taylor expansion of the evaluation function F(X) near $X=X_0$ yields:

$$F(X) \approx F(X_0) + A\Delta X \quad \text{(Equation 7)}$$

A is a partial derivative matrix (Jacobian). Equation 7 can be rewritten into each vector element as follows:

$$\begin{bmatrix} f_1(X) \\ f_2(X) \\ \vdots \\ f_m(X) \end{bmatrix} = \begin{bmatrix} f_1(X_0) \\ f_2(X_0) \\ \vdots \\ f_m(X_0) \end{bmatrix} + \quad \text{(Equation 8)}$$

$$\begin{bmatrix} \frac{\partial f_1(X_0)}{\partial X_1} & \frac{\partial f_1(X_0)}{\partial X_2} & \cdots & \frac{\partial f_1(X_0)}{\partial X_n} \\ \frac{\partial f_2(X_0)}{\partial X_1} & \frac{\partial f_2(X_0)}{\partial X_2} & \cdots & \frac{\partial f_2(X_0)}{\partial X_n} \\ \vdots & \vdots & \ddots & \vdots \\ \frac{\partial f_m(X_0)}{\partial X_1} & \frac{\partial f_m(X_0)}{\partial X_2} & \cdots & \frac{\partial f_m(X_0)}{\partial X_n} \end{bmatrix} \begin{bmatrix} \Delta X_1 \\ \Delta X_2 \\ \vdots \\ \Delta X_n \end{bmatrix}$$

The extreme value condition of the merit function φ(X) is $\nabla \phi^T(X) = 0$. This can be rewritten using Equations 6 and 7 as follows:

$$\{A^T A + \rho I\} \Delta X = -A^T F(X_0) \quad \text{(Equation 9)}$$

where I is an identity matrix. Equation 9 is solved for ΔX as follows:

$$\Delta X = -\{A^T A + \rho I\}^{-1} A^T F(X_0) \quad \text{(Equation 10)}$$

On the basis of the above description, specific redesign will be described with reference to the flow of FIG. 7. FIG. 7 shows a flow of the redesign of an optical element (imaging lens). First, for a particular surface in the optical functional surfaces of the imaging lens, a lens shape such that the coefficients of Equation 3 described above are changed individually by a minute amount (about 1/1000 of the coefficient in the design value) is made. Then, ray trace is performed using an optical software or the like, the amount of focus position change in the main scanning direction at the same position as the image height where measurement was performed is calculated, and the calculation result is made into a sensitivity matrix A such as that shown in FIG. 8 (sensitivity calculating step).

Using this sensitivity matrix A, a variable vector $\Delta X$ is obtained from Equation 10. Each coefficient of Equations 1 and 2 in the particular surface is changed by $\Delta X$, and an evaluation vector $F(X)$ is calculated. Until the merit function $\phi(X)$ of Equation 6 converges, according to the flow of FIG. 7, (calculation of sensitivity matrix A by ray trace), (calculation of variable vector $\Delta X$), and (calculation of evaluation vector $F(X)$) are repeated. Through the flow of FIG. 7, a shape function of an optical functional surface that agrees with the value measured with the evaluation tool is obtained (main scanning redesign step).

Although the surface the coefficients of which are changed is a particular surface, in the lens design, there is a surface sensitive to the focus in the main scanning direction. If the shape of the optical functional surface that agrees with the actual focus position is reproduced using the surface sensitive to the focus, the shape may change drastically from the design value. Although the focus moves toward the design value after the correction of the optical insert, the fθ characteristic may deviate significantly from the design value. Therefore, when a surface the coefficients of which are actually changed is selected, a surface sensitive to the focus change to be reproduced should be selected.

In the case of a surface sensitive to the focus change, and when the amount of shape change relative to the design value is large, it is desirable to reduce the influence on the fθ characteristic by changing the coefficients of not one surface but two surfaces. Although the evaluation information of the sensitivity matrix A is the amount of focus change in the main scanning direction at the image height measured, the fθ characteristic can also be evaluated at the same time by adding the amount of irradiation position change at the image height measured.

Figure 9:
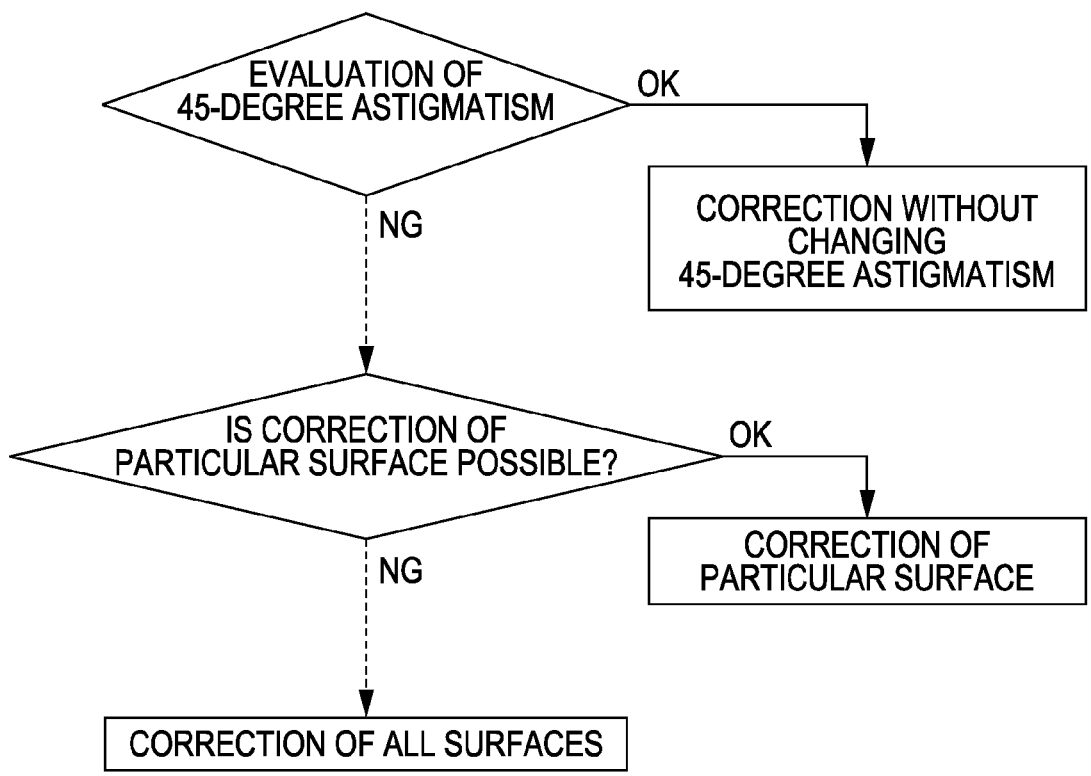
FIG. 9 is a flowchart showing a method for correction based on the result of the 45-degree astigmatism.

After the focus position is determined, the evaluation and correction of the 45-degree astigmatism are performed according to the flow of FIG. 9. FIG. 9 is a flow of a method for correction based on the result of the 45-degree astigmatism. The 45-degree astigmatism can be obtained by making an optical model on the basis of the shape of the optical functional surface obtained in the above-described shape approximation step, and calculating the 45-degree astigmatism by ray trace, or can be evaluated by the measurement to be described below.

Figure 10A:
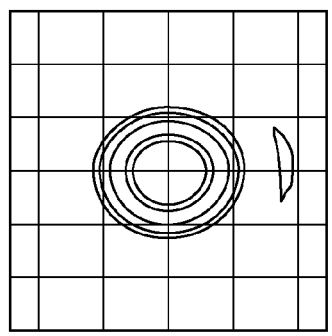
FIGS. 10A, 10B, and 10C show the spot rotation due to the 45-degree astigmatism, and the change in spot diameter in the case where a cylindrical lens is rotated in the defocus measurement tool.
Figure 10B:
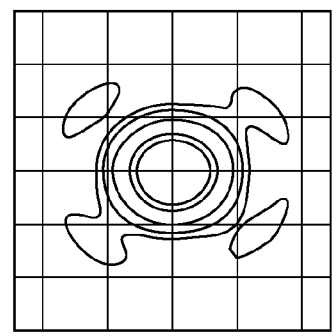
Figure 10C:
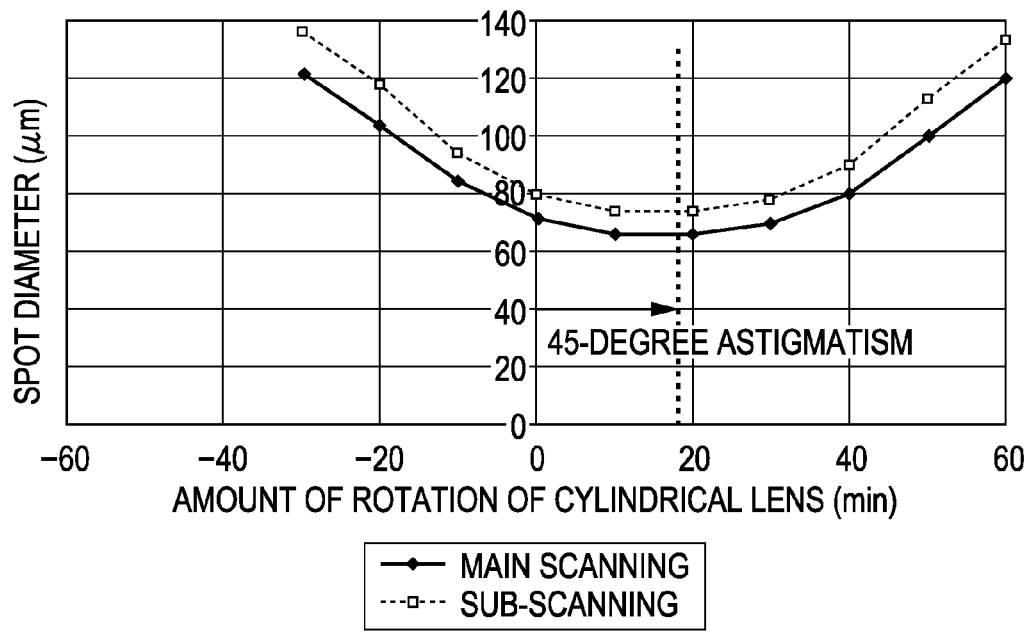

In the evaluation tool shown in FIG. 5B, the cylindrical lens 4 is rotated relative to the nominal position, as shown in the figure, about the optical axis direction of the cylindrical lens 4. With the rotation, the circular spot in FIG. 10A is deformed as shown in FIG. 10B, and enlargement of spot diameter occurs. The change in spot diameter relative to the rotation angle of the cylindrical lens 4 in FIG. 10C shows that the larger the rotation angle at which the spot diameter is smallest, the larger the 45-degree astigmatism. From the rotation direction of the cylindrical lens 4, the sign of the 45-degree astigmatism can be known. If the amount of 45-degree astigmatism obtained by evaluation has little effect on the minimum spot diameter due to defocus (the amount of enlargement within 2 to 3 µm relative to the design value), a correction that does not change the 45-degree astigmatism needs to be performed. If the minimum spot diameter due to defocus is enlarged by the influence of the 45-degree astigmatism, a correction that controls the 45-degree astigmatism needs to be performed.

A method for correcting the 45-degree astigmatism will be described taking the correction of sagittal line shape as an example. For a particular surface of a plurality of optical functional surfaces, the following equation defined by Equation 9 transformed from Equation 4 is added to the sagittal line shape determined by Equation 2.

$$\Delta x = (T_0 + M_1 y) \times \{z - s(y)\} + (c_0/2) \times \{z - s(y)\}^2 \qquad \text{(Equation 11)}$$

Herein, $c_0$ is, for example, the curvature changed relative to the effective width of the sagittal line by one Newton's ring. $T_0$ is, for example, $\tan(3')$, and $M_1$ is a minute amount, for example, of about 1/1000. At each image height measured, the focus in the sub-scanning direction in the design value, the irradiation position in the sub-scanning direction, and the amount of increase and decrease in 45-degree astigmatism before and after Equation 9 is added are obtained. From these, the focus sensitivity in the sub-scanning direction at the measured image height in the case where the curvature of the sagittal line is changed by one Newton's ring in the effective width, and the irradiation position sensitivity in the sub-scanning direction at the measured image height in the case where the inclination of the sagittal line is changed by 3' can be known. In addition, the 45-degree astigmatism sensitivity in the case where the inclination of the sagittal line changes by 0.05' with the change in the optical functional surface position Y in the main scanning direction is obtained. By repeating this operation for the number of the optical functional surfaces, the optical sensitivity to three evaluation items (sub-scanning focus, sub-scanning irradiation position, and 45-degree astigmatism) in each surface is obtained.

Using a sensitivity table obtained in this way, the sagittal line curvature and the sagittal line inclination at positions where light rays reaching a plurality of image heights pass through the optical functional surface are obtained by calculation so that they agree with the values measured with the measurement tool (the sub-scanning focus, the sub-scanning irradiation position, and the 45-degree astigmatism). From the sagittal line curvature and the sagittal line inclination obtained at a plurality of positions through which light rays pass, each coefficient of Equation 4 is determined by fitting. If a single surface is not enough, calculation needs to be performed using a plurality of surfaces (sub-scanning redesign step).

As described above, by calculating the difference between the shape function of the newly designed optical functional surface and the shape function of the design value using Equations 3 and 4, and adding this function to the optical insert, the optical characteristic of the imaging lens molded after the correction moves toward the design value (correction step). If the ratio of the length in the main scanning direction of the optical functional surface in the molded lens to the length in the main scanning direction of the optical insert is known, the part concerning the coefficient of Y of Equations 3 and 4 is multiplied by this ratio according to the degree of Y. This can bring the optical performance of the molded imaging lens closer to the design value.

On the basis of the newly obtained function, the optical insert is processed again. At this time, in order to correct the optical functional surface, the thickness of the central part of the lens, and the position of the vertex of the optical functional surface relative to the reference plane, the position of the optical insert relative to the mold is adjusted. On the basis of the newly obtained function, the optical insert is processed again. Then, molding is performed again. The shape of the optical functional surface, the thickness of the central part of the lens, and the vertex position of the optical functional surface relative to the reference plane, are measured. It is checked whether or not the shape error to the design value is within the allowable range. In addition, the optical performance of the imaging lens molded again is measured using the evaluation tool of FIG. 5B, and it is checked whether or not the focus error to the design value is within the allowable range. If the errors are within the allowable range, the correction is ended. If the errors are out of the allowable range, the steps of redesigning the shape of the optical functional surface of the particular surface from the result of focus measurement and checking the corrected shape of the optical insert need to be repeated until the focus error is within the allowable range.

Table 1 shows the optical arrangement, the shape, and the characteristic of material used, of each lens in the optical system of the first embodiment. Table 2 shows the shapes of the optical functional surfaces of the anamorphic lenses 1 and 2. The signs in Table 2 are the same as those in the above-described Equations 1 and 2. In this specification, the anamorphic lens 1 corresponds to the imaging lens 6a, and the anamorphic lens 2 corresponds to the imaging lens 6b.

Figure 11A:
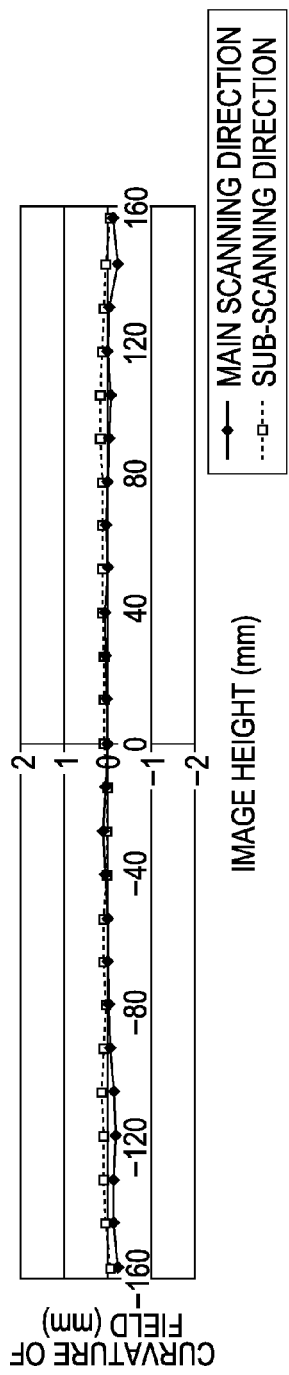
FIG. 11A shows the amount of the curvature of field in the first embodiment of the present invention.
Figure 11B:
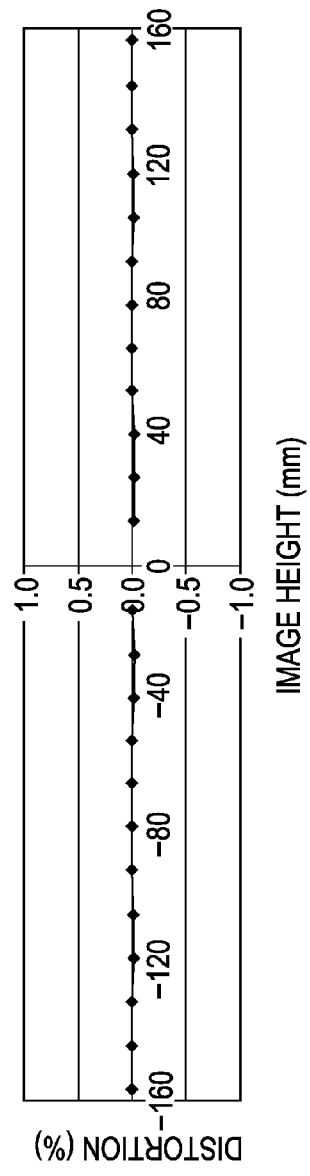
FIG. 11B shows the fθ characteristic in the first embodiment of the present invention.
Figure 11C:
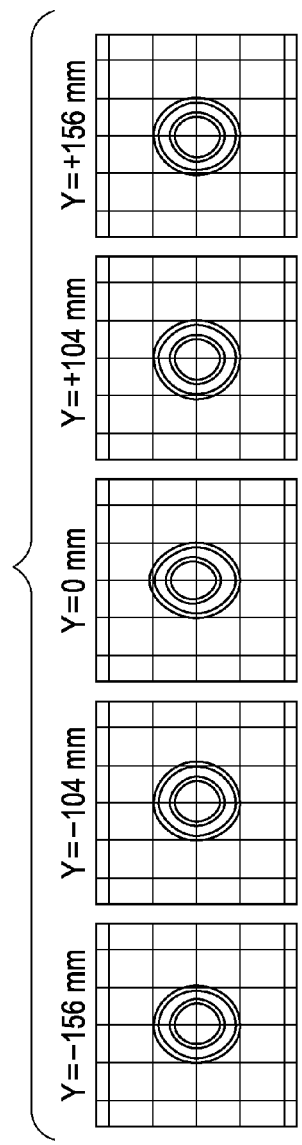
FIG. 11C shows spots in the first embodiment of the present invention.
Figure 12A:
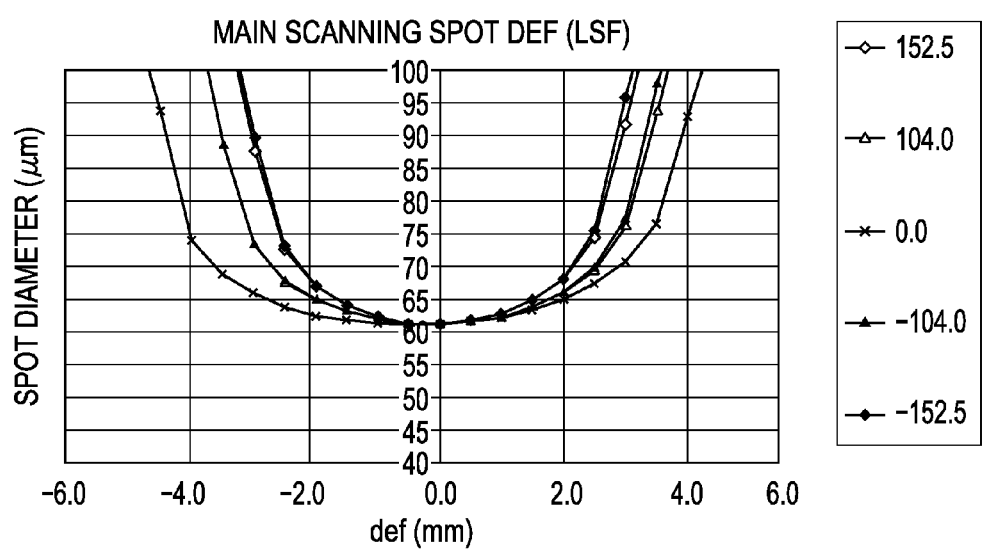
FIGS. 12A and 12B show the defocus characteristic of the spot diameter in the first embodiment of the present invention.
Figure 12B:
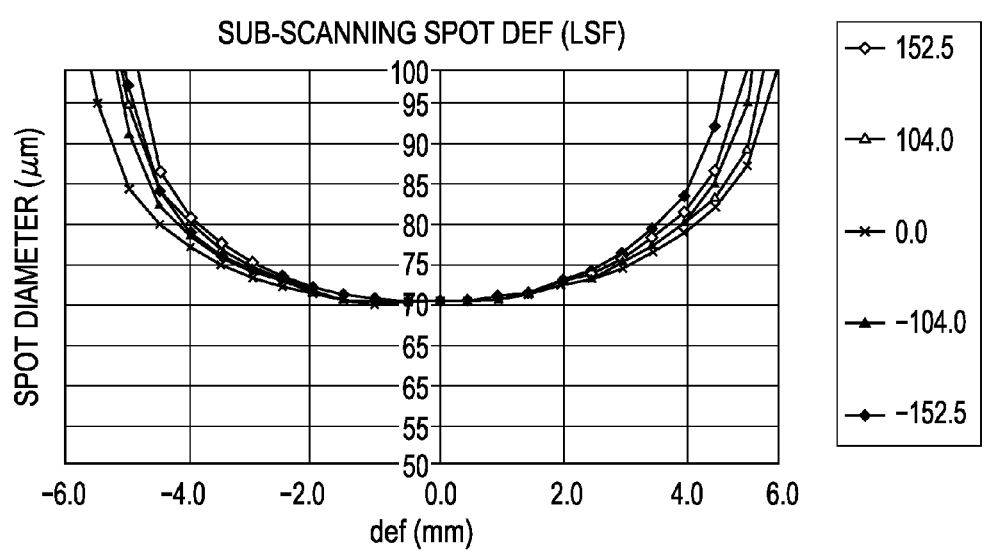

FIG. 11A shows the curvature of field on the surface to be scanned in the optical system of the first embodiment of the present invention. FIG. 11B shows the fθ characteristic in the optical system of the first embodiment of the present invention. FIG. 11C shows the shape of spot on the surface to be scanned (contours of 5%, 10%, 13.5%, 36.8%, and 50% of the peak amount of light) in the optical system of the first embodiment of the present invention. FIGS. 12A and 12B show the spot diameters in the main scanning direction and the sub-scanning direction in the case where the image plane position of the first embodiment of the present invention is defocused.

TABLE 1

| Basic points | | | |
|---|---|---|---|
| Wavelength used | λ (nm) | 790 | |
| Scanning angle | θ (deg) | 42.56 | |
| fθ coefficient | f | 210.00 | |
| Circumradius of polygon | R (mm) | 16 | |
| Number of facets of polygon | M | 5 | |
| Incidence angle in sub-scanning direction | ε (deg) | 3 | |
| Incidence angle in deflecting direction | γ (deg) | 74 | |
| Incident system arrangement | | | |
| Distance between light source and collimator lens | d1 (mm) | 27.4 | |
| Central thickness of collimator lens | d2 (mm) | 3.0 | |
| Distance between collimator lens and cylindrical lens | d3 (mm) | 44.8 | |
| Central thickness of cylindrical lens | d4 (mm) | 6.0 | |
| Distance between cylindrical lens and deflecting surface | d5 (mm) | 91.3 | |
| Refractive index of collimator lens | n1 | 1.76167 | |
| Refractive index of cylindrical lens | n2 | 1.51052 | |

| | Meridional line R | | Sagittal line r | |
|---|---|---|---|---|
| | First surface | Second surface | First surface | Second surface |
| Collimator lens | ∞ | 22.93 | — | — |
| Cylindrical lens | ∞ | ∞ | 48.15 | ∞ |

| Scanning system arrangement | | | |
|---|---|---|---|
| Distance between deflecting surface and anamorphic lens 1 | D1 (mm) | 29.5 | |
| Central thickness of anamorphic lens 1 | D2 (mm) | 8.0 | |
| Distance between anamorphic lenses 1 and 2 | D3 (mm) | 76.0 | |
| Central thickness of anamorphic lens 2 | D4 (mm) | 5.0 | |

TABLE 1-continued

| Distance between anamorphic lens 2 and surface to be scanned | D5 (mm) | 129.3 | |
|---|---|---|---|
| Refractive index of anamorphic lens 1 | n3 | 1.52397 | |
| Refractive index of anamorphic lens 2 | n4 | 1.52397 | |

| | Meridional line R | | Sagittal line r | |
|---|---|---|---|---|
| | First surface | Second surface | First surface | Second surface |
| Anamorphic lens 1 | −61.63 | −39.38 | 1551.38 | 384.67 |
| Anamorphic lens 2 | 1200.00 | −37.96 | 195.41 | −47.83 |

TABLE 2

| | Surface shape of anamorphic lens 1 | | Surface shape of anamorphic lens 2 | |
|---|---|---|---|---|
| | First surface | Second surface | First surface | Second surface |
| R | −6.163E+01 | −3.938E+01 | R  1.551E+03 | 3.847E+02 |
| k | −8.752E+00 | −2.316E+00 | k  −3.567E+03 | −1.078E+02 |
| A2 | | | A2 | |
| A4 | −1.749E−06 | −2.080E−06 | A4 −3.039E−08 | −2.162E−07 |
| A6 | 3.213E−09 | 1.510E−09 | A6 | 1.736E−11 |
| A8 | −3.260E−12 | −6.249E−13 | A8 | −1.228E−15 |
| A10 | 1.089E−15 | −2.270E−16 | A10 | 3.507E−20 |
| c0 | 8.333E−03 | −2.634E−02 | c0 5.117E−03 | −2.091E−02 |
| B2 | | 4.612E−05 | B2 −6.160E−05 | 1.016E−04 |
| B4 | | 1.635E−07 | B4 −5.503E−09 | −1.416E−08 |
| B6 | | | B6 7.290E−13 | 4.110E−12 |
| B8 | | | B8 −3.796E−17 | −4.927E−16 |
| B10 | | | B10 1.948E−21 | 4.016E−20 |

Y-axis sign + is on the side of the laser

Figure 13A:
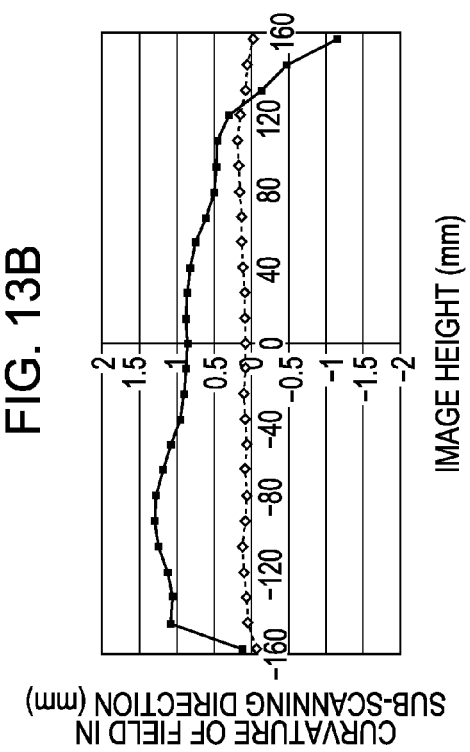
FIGS. 13A and 13B are diagrams comparing the depth center position of the imaging lens evaluated with the defocus measurement tool in the first embodiment of the present invention with the design value.
Figure 13B:
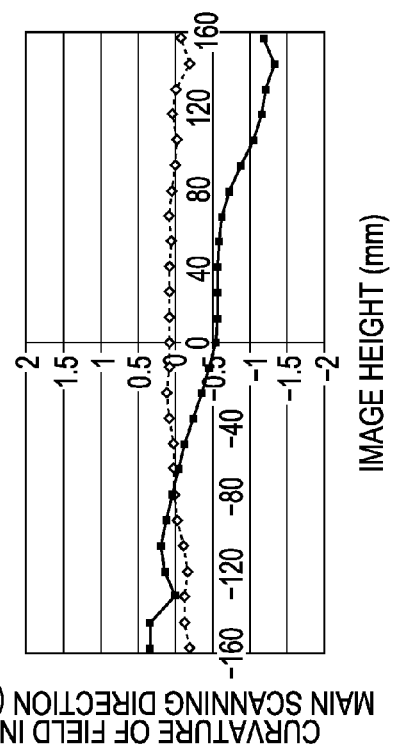
Figure 13C:
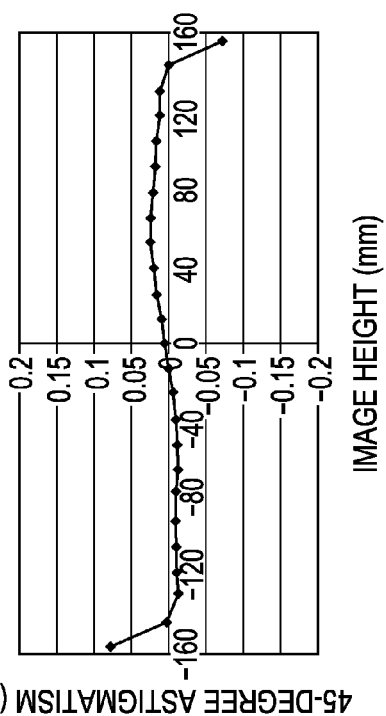
FIG. 13C is a diagram showing the irradiation position in the sub-scanning direction of the imaging lens evaluated with the defocus measurement tool.
Figure 13D:
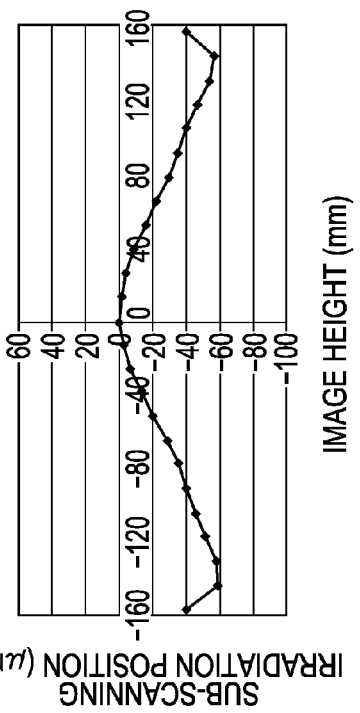
FIG. 13D is a diagram showing the 45-degree astigmatism of the imaging lens evaluated with the defocus measurement tool.

First, the optical insert is processed so that it has the aspherical shape shown in Table 2. Next, the initial molding is performed. The anamorphic lenses 1 and 2 obtained under stable molding conditions are mounted on the evaluation tool, and the focuses in the main scanning direction and the sub-scanning direction are evaluated. The results are shown in FIGS. 13A and 13B. As shown in FIGS. 13A and 13B, the focus in the main scanning direction and the focus in the sub-scanning direction are inclined to the design value (shown in dotted line). At the irradiation position in the sub-scanning direction, a curvature of about 60 μm occurs as shown in FIG. 13C. Next, the shape of the optical functional surface is measured. From the shape, an optical model is made. Ray trace is performed, and the 45-degree astigmatism is calculated. The results are shown in FIG. 13D.

In order to correct the defocus in the main scanning direction, the shape of the optical functional surface that agrees with the focus obtained with the evaluation tool was redesigned. The coefficients changed were those of the first surface of the anamorphic lens 1 sensitive to the focus in the main scanning direction. The difference between the shape function of the design value and the shape function calculated by performing redesign according to the flow of FIG. 7 is shown in Table 3. When the value of y is positive (on the semiconductor laser side), coefficients with a subscript u are used. When the value of y is negative (on the opposite side from the semiconductor laser), coefficients with a subscript l are used.

TABLE 3

| | |
|---|---|
| E2u | -9.736E-07 |
| E4u | 5.458E-08 |
| E6u | -1.625E-10 |
| E8u | 2.460E-13 |
| E10u | -1.198E-16 |
| E12u | 0 |
| E14u | 0 |
| E16u | 0 |
| E2l | -9.736E-07 |
| E4l | 1.756E-08 |
| E6l | -7.144E-11 |
| E8l | 1.194E-13 |
| E10l | -5.495E-17 |
| E12l | 0 |
| E14l | 0 |
| E16l | 0 |

Figure 14A:
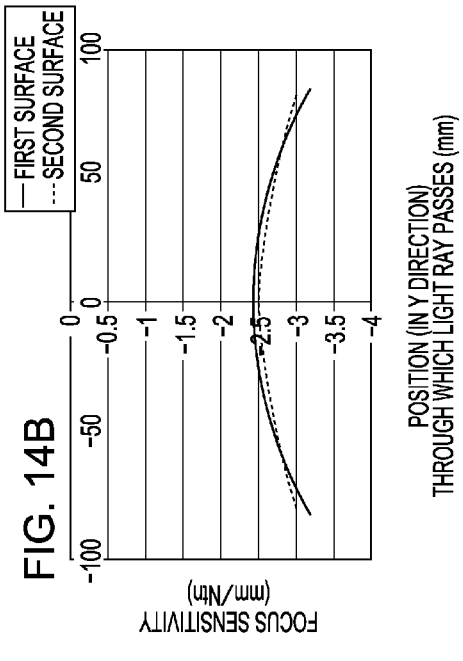
FIGS. 14A, 14B, 14C, and 14D show the position on the optical functional surface through which a light ray passes, the sub-scanning focus sensitivity due to a minute change in shape, the sensitivity to the irradiation position in the sub-scanning direction, and the 45-degree astigmatism sensitivity, in the first embodiment of the present invention.
Figure 14B:
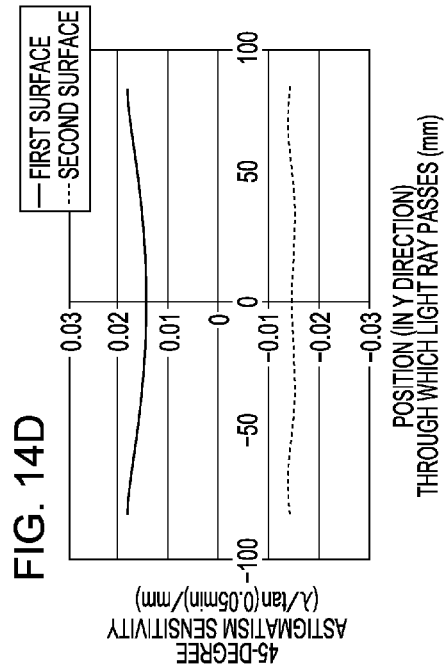
Figure 14C:
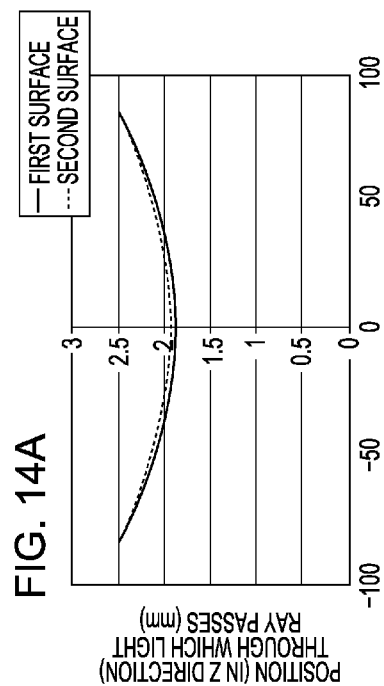
Figure 14D:
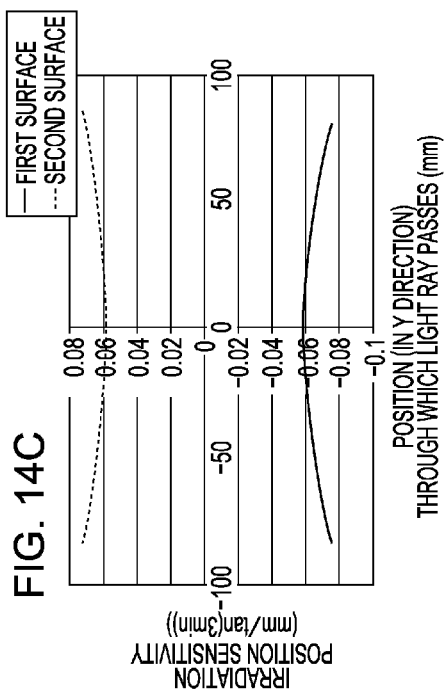

Next, the defocus in the sub-scanning direction, the irradiation position, and the 45-degree astigmatism are corrected. FIG. 14A shows the position where a light ray passes through each optical functional surface of the anamorphic lens 2. In FIG. 14A, the origin shows the position of the optical axis of the optical functional surface. FIG. 14B shows the defocus in the sub-scanning direction in the case where the shape is minutely changed at the position where a light ray passes of the anamorphic lens 2 shown in FIG. 14A. FIG. 14C shows the irradiation position sensitivity. FIG. 14D shows the 45-degree astigmatism sensitivity. In FIGS. 14A to 14D, the origin shows the position of the optical axis of the optical functional surface.

For calculating the focus, the curvature at each position through which a light ray passes was changed so that the number of Newton's rings in a width of 3 mm changes by one. For calculating the irradiation position, an inclination in the sub-scanning direction of 3' was given at each position through which a light ray passes. For calculating the 45-degree astigmatism, a shape such that the inclination in the sub-scanning direction changes by 0.05° across the board from the optical axis to the end portions of the optical functional surface, was given.

Figure 15A:
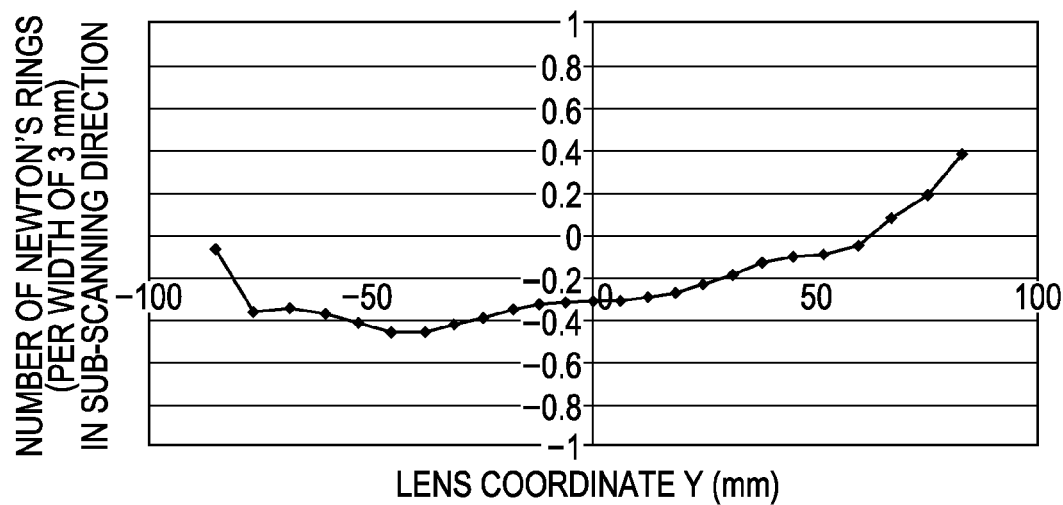
FIGS. 15A and 15B show the amount of sub-scanning curvature Newton change that corrects the sub-scanning depth center position of the imaging lens, and the amount of change in inclination in the sub-scanning that corrects the irradiation position in the sub-scanning direction of the imaging lens, in the first embodiment of the present invention.

On the basis of the sensitivity of FIG. 14B, the curvature in the sub-scanning direction of the second surface of the anamorphic lens 2 was calculated so that the focus in the sub-scanning direction at each position through which a light ray passes is consistent with the focus shown in FIG. 13B. The result is shown in FIG. 15A. On the basis of the result of FIG. 15A, function fitting defined by Equation 4 was performed. The result is shown in Table 4. When the value of y is positive (on the semiconductor laser side), coefficients with a subscript u are used. When the value of y is negative (on the opposite side from the semiconductor laser), coefficients with a subscript l are used.

TABLE 4

| | |
|---|---|
| cΔ | -1.999E-05 |
| F2u | 1.570E-09 |
| F4u | 1.675E-11 |
| F6u | -1.368E-14 |
| F8u | 4.350E-18 |
| F10u | -6.032E-22 |
| F12u | 3.060E-26 |
| F2l | -9.307E-09 |
| F4l | -4.705E-14 |
| F6l | 2.176E-15 |
| F8l | -5.771E-19 |
| F10l | 4.280E-23 |
| F12l | 0 |

Figure 15B:
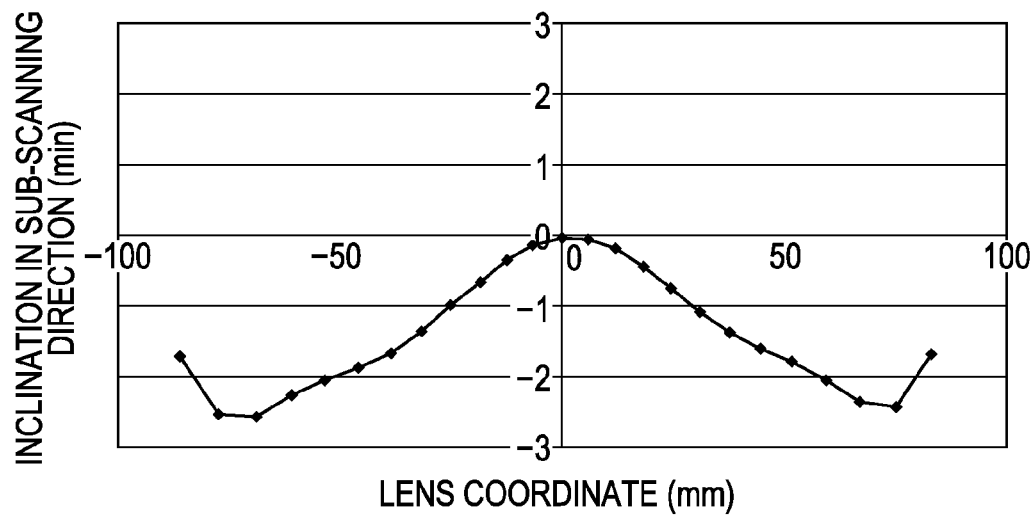
Figure 16A:
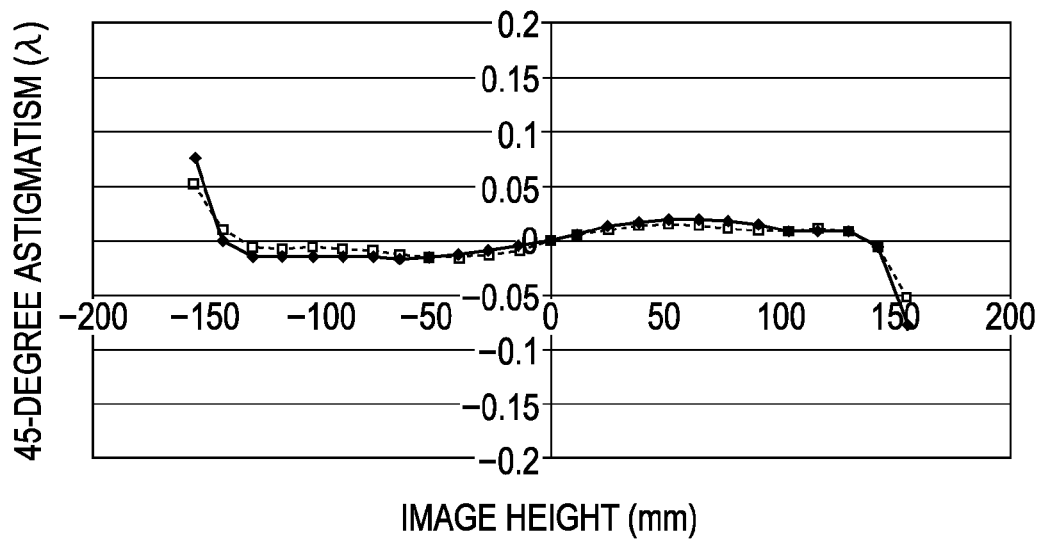
FIGS. 16A and 16B are diagrams showing the amount of change in 45-degree astigmatism in the case where the irradiation position in the sub-scanning of the imaging lens in the first embodiment of the present invention is corrected.
Figure 16B:
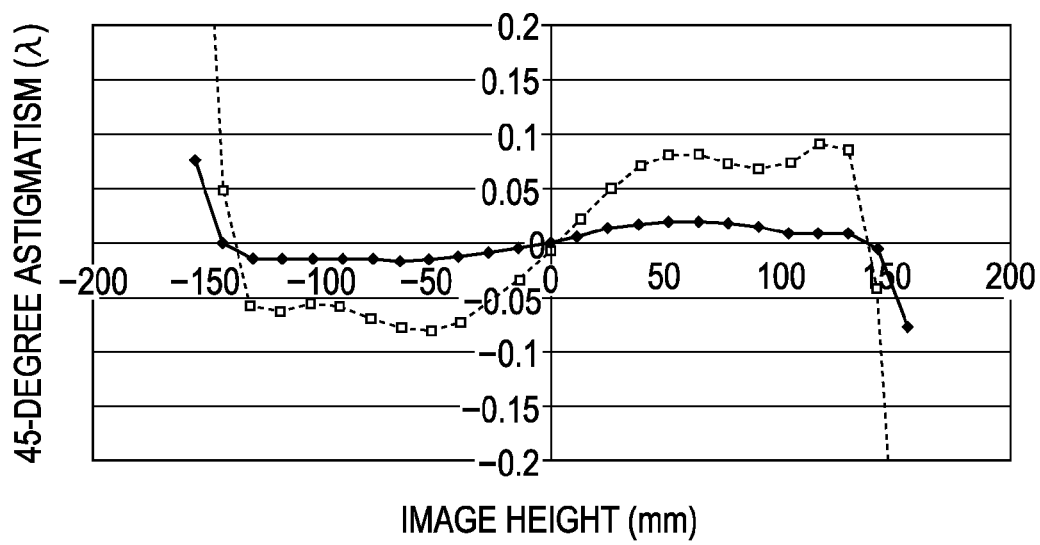
Figure 17A:
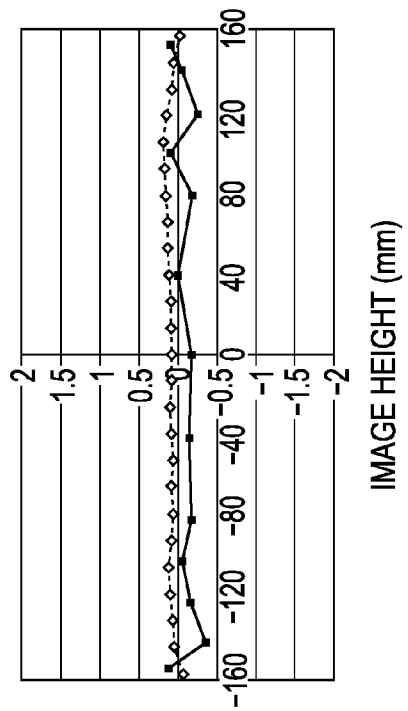
FIGS. 17A, 17B, 17C, and 17D are diagrams showing the depth center position, the irradiation position in the sub-scanning direction, and the 45-degree astigmatism, of the imaging lens after correction processing measured with the defocus measurement apparatus in the first embodiment of the present invention.
Figure 17B:
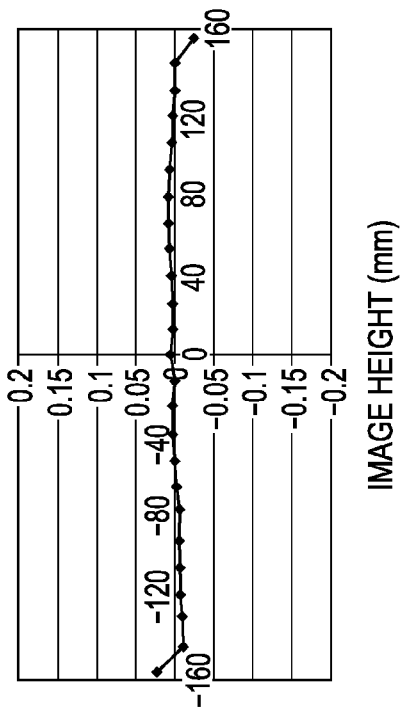
Figure 17C:
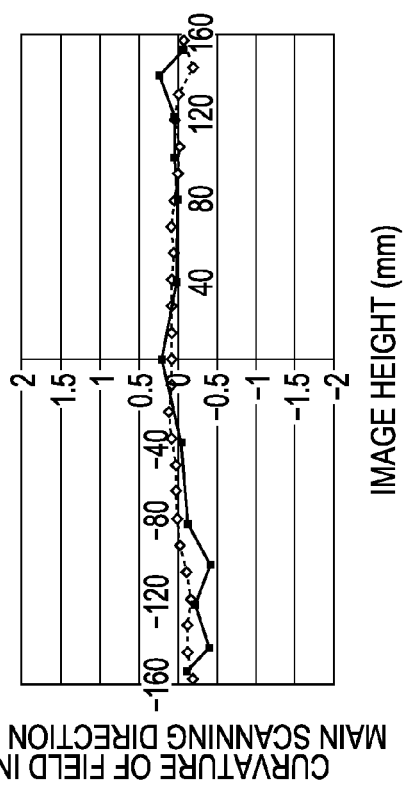
Figure 17D:
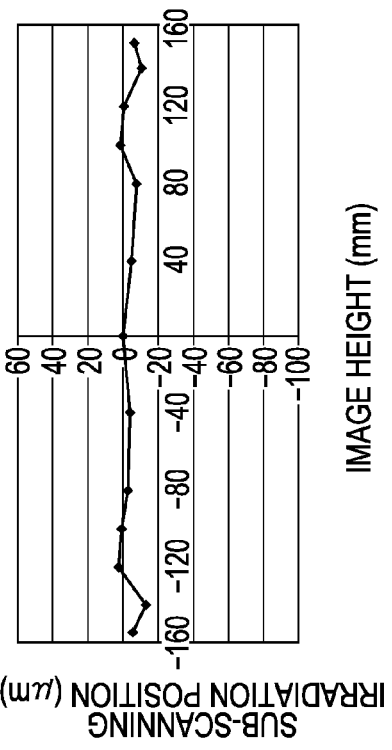

Next, from the sensitivity of FIG. 14C, the inclination in the sub-scanning direction of the second surface of the anamorphic lens 2 was calculated so that the irradiation position in the sub-scanning direction is as shown in FIG. 13C. The result is shown in FIG. 15B. Next, the derivative value was calculated from the function to which the values obtained in FIG. 15B were fitted, and the 45-degree astigmatism was calculated from the 45-degree astigmatism sensitivity of FIG. 14D. The result of calculation is shown in FIG. 16A. Almost the same result as the 45-degree astigmatism calculated in the shape approximation step (dotted line) was obtained. From this, it can be seen that by correcting the irradiation position in the sub-scanning direction in the second surface, the 45-degree astigmatism can also be corrected. For reference, the amount of 45-degree astigmatism in the case where the inclination in the sub-scanning direction that corrects the irradiation position in the sub-scanning direction in the second surface of the anamorphic lens 1 is calculated, is shown in FIG. 16B. As shown in FIG. 16B, the amount of 45-degree astigmatism is apart from that obtained in the shape approximation step (dotted line). If the irradiation position in the sub-scanning direction is corrected in this surface, the 45-degree astigmatism may deteriorate.

The result of the function fitting defined by Equation 4 and performed on the basis of the result of FIG. 15B is shown in FIG. 15B. When the value of y is positive (on the semiconductor laser side), coefficients with a subscript u are used. When the value of y is negative (on the opposite side from the semiconductor laser), coefficients with a subscript l are used.

TABLE 5

| | |
|---|---|
| T0 | -1.069E-05 |
| M2u | -4.625E-07 |
| M4u | 1.785E-10 |
| M6u | -3.813E-14 |
| M8u | 3.288E-18 |
| M10u | -4.771E-23 |
| M2l | -6.214E-07 |
| M4l | 2.967E-10 |
| M6l | -7.532E-14 |
| M8l | 8.701E-18 |
| M10l | -3.425E-22 |

From the shape function of the optical insert of the first surface of the anamorphic lens 1 (the shape function of the optical insert used in the initial molding), the amount of error of Table 3 was subtracted to determine the shape of the optical insert. From the shape function of the second surface of the anamorphic lens 2, the amount of error of Tables 4 and 5 was subtracted to determine the shape of the optical insert.

After the correction processing of the optical insert, anamorphic lenses 1 and 2 obtained in the second molding were measured with the evaluation tool. The result is shown in FIGS. 17A, 17B, 17C, and 17D. In FIGS. 17A, 17B, 17C, and 17D, both the focus in the main scanning direction (FIG. 17A) and the focus in the sub-scanning direction (FIG. 17B) agree with the focuses of the design values. In addition, both the irradiation position in the sub-scanning direction (FIG. 17C) and the 45-degree astigmatism (FIG. 17D) were successfully corrected, and correction processing was completed in one correction.

As described above, in this embodiment, the shape of the optical insert is corrected so that the shape of the optical functional surface of a plastic lens made by injection molding moves toward a desired design shape, and an additional correction is performed on the shape of the optical insert of some of the optical functional surfaces so that the influence due to the nonuniformity inside the lens is offset. Therefore, in this embodiment, a method can be provided that is for correcting an optical insert in injection molding of a plastic lens and that can achieve both the reduction in curvature of field and the fθ characteristic.

Color Image Forming Apparatus

Figure 18:
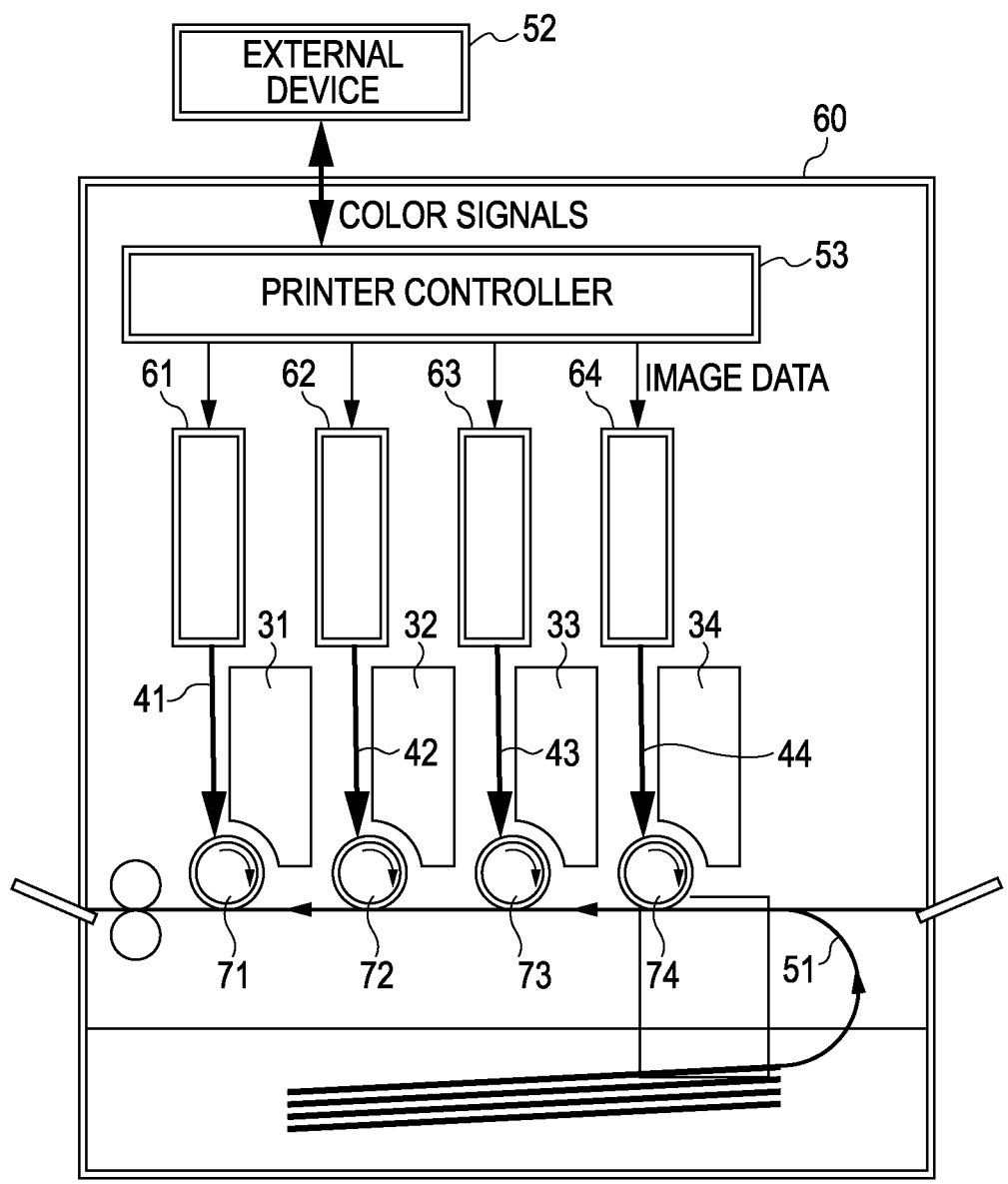
FIG. 18 is a schematic view of parts of a color image forming apparatus according to an embodiment of the present invention.

FIG. 18 is a schematic view of pertinent parts of a color image forming apparatus according to an embodiment of the present invention. This embodiment is a tandem-type color image forming apparatus in which four optical scanning apparatuses (optical scanning systems) are arranged in tandem and the optical scanning apparatuses concurrently record image information on the surfaces of photosensitive drums serving as image bearing members. In FIG. 18, reference numerals 60 denotes a color image forming apparatus, reference numerals 61, 62, 63, and 64 denote optical scanning apparatuses each having any one of the lens structures shown in the first embodiment, reference numerals 71, 72, 73, and 74 denote photosensitive drums serving as image bearing members, reference numerals 31, 32, 33, and 34 denote developing units, and reference numeral 51 denotes a conveying belt. The color image forming apparatus 60 has transfer units (not shown) that transfer toner images developed in the developing units onto a recording material, and fixing units (not shown) that fix the transferred toner images on the recording material.

Color signals of R (red), G (green), and B (blue) are input into the color image forming apparatus 60 from an external device 52 such as a personal computer. The color signals are converted into image data (dot data) of C (cyan), M (magenta), Y (yellow), and B (black) by a printer controller 53 in the apparatus. The image data are input into the optical scanning apparatuses 61, 62, 63, and 64. The optical scanning apparatuses emit optical beams 41, 42, 43, and 44 modulated according to the image data. The photosensitive surfaces of the photosensitive drums 71, 72, 73, and 74 are scanned by the optical beams in the main scanning direction.

In the color image forming apparatus in this embodiment, the four optical scanning apparatuses 61, 62, 63, and 64 are arranged in tandem, and correspond to C (cyan), M (magenta), Y (yellow), and B (black), respectively. The optical scanning apparatuses 61, 62, 63, and 64 concurrently record image signals (image information) on the surfaces of the photosensitive drums 71, 72, 73, and 74. Thus, a color image is printed at high speed.

In the color image forming apparatus in this embodiment, as described above, the four optical scanning apparatuses 61, 62, 63, and 64 form latent images of the respective colors on the surfaces of the corresponding photosensitive drums 71, 72, 73, and 74 using optical beams based on the respective image data. Thereafter, the images of the respective colors are multiply transferred onto a recording material so as to form a full-color image.

For example, a color image scanner having a CCD sensor may be used as the external device 52. In this case, the color image scanner and the color image forming apparatus 60 form a color digital copying machine.

The recording density of the image forming apparatus used in the present invention is not particularly limited. However, in view of the fact that the higher the recording density, the higher image quality is required, the first embodiment of the present invention is particularly effective for an image forming apparatus having a recording density of 1200 dpi or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-193029 filed Aug. 24, 2009, which is hereby incorporated by reference herein in its entirety.

What is claimed is:

1. A method for injection molding an imaging optical element that is to be used in an optical scanning apparatus, in which a light ray does not pass over a meridional line including an optical axis of the imaging optical element, the method comprising:

an initial molding step in which when the imaging optical element is injection-molded, molding conditions are set such that a constant shape error is stably formed on optical functional surfaces of the imaging optical element;

an optical measurement step in which the imaging optical element formed by the initial molding step is placed in an evaluation apparatus in which components of the evaluation apparatus are arranged in a same manner as components of the optical scanning apparatus during use, and an amount of defocus in an optical axis direction, an amount of wavefront aberration, and an amount of scanning line curvature at a plurality of image heights are measured on an image plane;

a shape approximation step in which shapes of all of the optical functional surfaces of the imaging optical element are measured, and a curved surface model is determined such that a sagittal line curvature and the sagittal line inclination of the imaging optical element are closest to a measurement result, at positions where light rays heading for a plurality of image heights pass through the optical functional surfaces;

an evaluation step in which the amount of defocus in the optical axis direction, the amount of scanning line curvature, and the amount of wavefront aberration are evaluated in an optical simulation using the curved surface model based on aspherical coefficients of the optical functional surfaces obtained in the shape approximation step;

a defocus sensitivity calculating step in which ray trace is performed using an optical model with the aspherical coefficients of the optical functional surfaces changed, an amount of change in the amount of defocus in the optical axis direction at the plurality of image heights are obtained, and a sensitivity of the amount of defocus to a change of each of the aspherical coefficients is calculated;

an inclination sensitivity calculating step in which ray trace is performed using the optical model with the aspherical coefficients of the optical functional surfaces changed, the amount of scanning line curvature and the amount of wavefront aberration at the plurality of image heights are obtained, and sensitivities of the amount of scanning line curvature and the amount of wavefront aberration to the change of each of the aspherical coefficients are calculated;

a first redesign step in which the shapes of at least one of the optical functional surfaces are newly redesigned on the basis of the sensitivity of the amount of defocus so that they agree with a difference between the amount of defocus obtained in the evaluation step and a result of calculation of the amount of change in the amount of defocus obtained in the defocus sensitivity calculating step;

a second redesign step in which the shapes of at least one of the optical functional surfaces are newly redesigned on the basis of the sensitivity of the amount of scanning line curvature so that they agree with a difference between the amount of scanning line curvature obtained in the evaluation step and a result of calculation of the amount of scanning line curvature obtained in the inclination sensitivity calculating step and so as not to deteriorate the amount of wavefront aberration;

a correction step in which, in the optical functional surfaces obtained in the first and second redesign steps, reflecting a difference between the shapes measured in the shape approximation step and the first and second redesign steps and a shape of a designed value, a shape of a cavity surface of a molding member is corrected and processed; and an actual molding step in which molding is performed using the molding member obtained in the correction step.

2. The method according to claim 1, wherein if a result of evaluation of an imaging optical element injection-molded using the molding member obtained in the correction step, in the defocus sensitivity calculating step is below standard, the defocus sensitivity calculating step, the inclination sensitivity calculating step, the first redesign step, the second redesign step, the correction step, and the actual molding step are repeated.

3. The method according to claim 1, wherein in the shape approximation step, the following aspherical equation $\Delta x$ is used:

$$\Delta x = T(y) \times \{z - s(y)\} + c(y) \times \{z - s(y)\}^2$$

where y is a position in a main scanning direction on the optical functional surface, z is a position in a sub-scanning direction on the optical functional surface, $T(y)$ is an inclination in the sub-scanning direction at the position y of the optical functional surface, $c(y)$ is a curvature in the sub-scanning direction at the position y of the optical functional surface, and $s(y)$ is a passing height of a light ray at the position y of the optical functional surface.

* * * * *